US011076399B2

(12) United States Patent
Chai et al.

(10) Patent No.: US 11,076,399 B2
(45) Date of Patent: *Jul. 27, 2021

(54) SERVICE TRANSMISSION METHOD, DEVICE, AND SYSTEM IN A WIRELESS COMMUNICATION NETWORK

(71) Applicant: Huawei Technologies Co., Ltd., Guangdong (CN)

(72) Inventors: Li Chai, Shenzhen (CN); Bo Lin, Beijing (CN); Liangliang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,969

(22) Filed: Jan. 18, 2019

(65) Prior Publication Data

US 2019/0174486 A1 Jun. 6, 2019

Related U.S. Application Data

(63) Continuation of application No. 15/588,231, filed on May 5, 2017, now Pat. No. 10,212,702, which is a (Continued)

(51) Int. Cl.
*H04W 4/00* (2018.01)
*H04W 72/04* (2009.01)
(Continued)

(52) U.S. Cl.
CPC ....... *H04W 72/0426* (2013.01); *H04L 5/0032* (2013.01); *H04W 28/08* (2013.01);
(Continued)

(58) Field of Classification Search
CPC ..... H04W 28/16; H04W 28/08; H04W 88/08; H04W 92/20
See application file for complete search history.

(56) References Cited

U.S. PATENT DOCUMENTS

2007/0286126 A1   12/2007   Prakash et al.
2011/0041021 A1   2/2011    Khoshnevis et al.
(Continued)

FOREIGN PATENT DOCUMENTS

CN   101909321 A   12/2010
CN   102064868 A   5/2011
(Continued)

OTHER PUBLICATIONS

3GPP TS 36.213 V10.6.0 (Jun. 2012),3rd Generation Partnership Project;Technical Specification Group Radio Access Network;Evolved Universal Terrestrial Radio Access (E-UTRA);Physical layer procedures(Release 10),total 125 pages.
(Continued)

*Primary Examiner* — Abdelnabi O Musa
(74) *Attorney, Agent, or Firm* — Gregg Jansen

(57) ABSTRACT

A service transmission method is provided. A first base station, which establishes an RRC connection with a UE, sends a request message to a second base station which is at least one of base stations serving the UE, where the request message includes service information, where the service information includes QoS information of a service and/or configuration information of an RB, and the request message instructs the second base station to perform resource configuration according to service information. The first base station sends a configuration message to the UE, where the configuration message includes configuration list information of the RB and/or cell information of the offload base station.

20 Claims, 19 Drawing Sheets

Related U.S. Application Data continuation of application No. 14/599,771, filed on Jan. 19, 2015, now Pat. No. 9,648,610, which is a continuation of application No. PCT/CN2012/078944, filed on Jul. 20, 2012.

(51) Int. Cl.
*H04W 28/08* (2009.01)
*H04L 5/00* (2006.01)
*H04W 28/16* (2009.01)
*H04W 88/08* (2009.01)
*H04W 92/20* (2009.01)

(52) U.S. Cl.
CPC ............ *H04W 28/16* (2013.01); *H04W 88/08* (2013.01); *H04W 92/20* (2013.01)

(56) References Cited

U.S. PATENT DOCUMENTS

| | | | |
|---|---|---|---|
| 2011/0070884 A1 | 3/2011 | Choi et al. | |
| 2011/0134831 A1* | 6/2011 | Pirskanen | H04L 5/001 370/328 |
| 2012/0142278 A1 | 6/2012 | Wang et al. | |
| 2012/0155291 A1 | 6/2012 | Koivisto et al. | |
| 2014/0010207 A1* | 1/2014 | Horn | H04W 36/165 370/332 |
| 2014/0241265 A1* | 8/2014 | Pragada | H04W 72/04 370/329 |

FOREIGN PATENT DOCUMENTS

| | | |
|---|---|---|
| CN | 102104855 A | 6/2011 |
| CN | 102238519 A | 11/2011 |
| CN | 102457964 A | 5/2012 |
| CN | 102474752 A | 5/2012 |
| CN | 102480756 A | 5/2012 |
| CN | 102549941 A | 7/2012 |
| WO | 2011022148 A1 | 2/2011 |
| WO | 2011100492 A1 | 8/2011 |
| WO | 2014008380 A1 | 1/2014 |

OTHER PUBLICATIONS

3GPP TS 36.300 V11.2.0 (Jun. 2012),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 11),total 201 pages.

3GPP TS 36.331 V11.0.0 (Jun. 2012),3rd Generation Partnership Project;Technical Specification Group Radio Access Network;Evolved Universal Terrestrial Radio Access (E-UTRA);Radio Resource Control (RRC);Protocol specification (Release 11),total 302 pages.

3GPP TS 36.423 V11.1.0 (Jun. 2012),3rd Generation Partnership Project;Technical Specification Group Radio Access Network;Evolved Universal Terrestrial Radio Access Network (E-UTRAN);X2 application protocol (X2AP)(Release 11), total 134 pages.

3GPP TS 36.424 V10.1.0 (Jun. 2011),3rd Generation Partnership Project;Technical Specification Group Radio Access Network;Evolved Universal Terrestrial Radio Access Network (E-UTRAN);X2 data transport(Release 10),total 8 pages.

* cited by examiner

```
┌─────────────────────────────────────────────────────────┐
│ A first base station sends a request message to an offload base │
│ station, where the request message includes at least one piece of │
│    service information, where the service information includes    │
│    QoS information of a service and/or configuration information  │──── 201
│    of an RB, the first base station is a base station that establishes │
│      an RRC connection with the user terminal, the offload base   │
│    station is at least one base station in base stations serving the │
│ user terminal, and the request message instructs the offload base │
│    station to perform resource configuration according to the at  │
│                   least one piece of service information          │
└─────────────────────────────────────────────────────────┘
                              │
                              ▼
┌─────────────────────────────────────────────────────────┐
│ The first base station receives a response message returned by │
│   the offload base station, where the response message includes │
│        an identifier of the UE, and a status message and/or an  │
│    indication message; where the status message includes a status │── 202
│   message for rejecting the request message, or a status message │
│        for receiving the request message, or a status message for │
│       modifying the request message; and the indication message   │
│ includes an identifier and/or configuration information of an RB │
│   whose resource configuration is accepted and/or an identifier of │
│   a corresponding RAB, and/or an identifier and/or configuration  │
│   information of an RB whose resource configuration is rejected   │
│              and/or an identifier of a corresponding RAB          │
└─────────────────────────────────────────────────────────┘
                              │
                              ▼
┌─────────────────────────────────────────────────────────┐
│ The first base station sends a configuration message to the user │── 203
│         terminal, where the configuration message includes        │
│   configuration list information of the RB and/or cell information │
│   of the offload base station, so that the user terminal configures │
│    the corresponding RB according to the configuration message    │
└─────────────────────────────────────────────────────────┘
```

FIG. 2

```
┌─────────────────────────────────────────────────────────────┐
│  A first base station sends a request message to an offload  │
│   base station, where the request message includes at least  │
│  one piece of service information, where the service         │
│  information includes QoS information of a service and/or   ├── 501
│  configuration information of an RB, the first base station  │
│  is a base station that establishes an RRC connection with   │
│  the user terminal, the offload base station is at least one │
│  base station in base stations serving the user terminal,    │
│  and the request message instructs the offload base station  │
│     to establish the RB corresponding to the at least one    │
│                  piece of service information                │
└──────────────────────────────┬──────────────────────────────┘
                               ▼
┌─────────────────────────────────────────────────────────────┐
│   The first base station sends a configuration message to   │
│  the user terminal, where the configuration message includes ├── 502
│  configuration list information of the RB corresponding to  │
│  the service and/or cell information of the offload base    │
│  station, so that the user terminal configures the          │
│      corresponding RB according to the configuration message │
└──────────────────────────────┬──────────────────────────────┘
                               ▼
┌─────────────────────────────────────────────────────────────┐
│   The first base station configures a measurement gap GAP   ├── 503
│              parameter of the user terminal                 │
└──────────────────────────────┬──────────────────────────────┘
                               ▼
┌─────────────────────────────────────────────────────────────┐
│  The first base station sends a measurement notification    │
│  message to the offload base station, where the notification├── 504
│  message includes an identifier of the user terminal, the   │
│  GAP parameter, and start time information of the GAP, and  │
│  the notification message is used to notify the offload base│
│  station of measurement configuration information of at     │
│   least one user terminal whose service is offloaded by the │
│                          base station                        │
└──────────────────────────────┬──────────────────────────────┘
                               ▼                            ── 505
┌─────────────────────────────────────────────────────────────┐
│  The first base station sends the GAP parameter to the user │
│                           terminal                           │
└─────────────────────────────────────────────────────────────┘
```

FIG. 5

An offload base station receives a request message sent by a first base station, where the request message includes at least one piece of service information, where the service information includes QoS information of a service and/or configuration information of an RB, the first base station is a base station that establishes an RRC connection with the user terminal, and the offload base station is a base station serving the user terminal — 601

The offload base station configures a resource configuration corresponding to the at least one piece of service information — 602

FIG. 6

SERVICE TRANSMISSION METHOD, DEVICE, AND SYSTEM IN A WIRELESS COMMUNICATION NETWORK

CROSS-REFERENCE TO RELATED APPLICATIONS

This application is a continuation of U.S. patent application Ser. No. 15/588,231, filed on May 5, 2017, which is a continuation of U.S. patent application Ser. No. 14/599,771, filed on Jan. 19, 2015, now U.S. Pat. No. 9,648,610, which is a continuation of International Application No. PCT/CN2012/078944, filed on Jul. 20, 2012. All of the aforementioned patent applications are hereby incorporated by reference in their entireties.

TECHNICAL FIELD

The present invention relates to the communications field, and in particular, to a service transmission method, a device, and a system.

BACKGROUND

A Long Term Evolution (LTE) network is a mobile communications network actively researched by manufacturers in the Third Generation Partnership Project (3GPP) organization, and is also an evolved network of a Universal Mobile Telecommunications System (UMTS). A purpose of the LTE network is to provide a network capable of reducing a delay, improving a user data rate, increasing a system capacity, and reducing coverage costs.

Currently, each user terminal, e.g, user equipment (UE), in the LTE network may be served by multiple serving base stations, in which a primary base station establishes a radio resource control (RRC) connection with the UE, and radio bearers (RB) corresponding to all services of the UE are all established by the primary base station, while other serving base stations only forward, at a physical layer, services sent by the primary base station, to the UE, and do not need to establish RBs. Consequently, resources (for example, an air interface, packet data convergence protocol (PDCP) entity resources, and radio link control (RLC) entity resources) of the other serving base stations cannot be utilized properly. However, because services of the UE currently grow fast, there is increasingly heavy pressure on the primary base station, resulting in low utilization of network resources.

SUMMARY

Embodiments of the present invention provide a service transmission method, a device, and a system, which may improve utilization of network resources.

A first aspect of the present invention provides a service transmission method, which may include:

sending, by a first base station, a request message to an offload base station, where the request message includes at least one piece of service information, where the service information includes QoS information of a service and/or configuration information of an RB, the first base station is a base station that establishes an RRC connection with the UE, the offload base station is at least one base station in base stations serving the UE, and the request message instructs the offload base station to perform resource configuration according to the at least one piece of service information; and sending, by the first base station, a configuration message to the UE, where the configuration message includes configuration list information of the RB and/or cell information of the offload base station, so that the UE configures the corresponding RB according to the configuration message.

A second aspect of the present invention provides another service transmission method, which may include:

receiving, by an offload base station, a request message sent by a first base station, where the request message includes at least one piece of service information, where the service information includes QoS information of a service and/or configuration information of an RB, the first base station is a base station that establishes an RRC connection with the UE, and the offload base station is a base station serving the UE; and configuring, by the offload base station, a resource configuration corresponding to the at least one piece of service information.

A third aspect of the present invention provides another service transmission method, which may include:

receiving, by a UE, a configuration message sent by a first base station, where the configuration message includes configuration list information of the RB and/or cell information of the offload base station, where the first base station is a base station that establishes an RRC connection with the UE, and the offload base station is at least one base station serving the UE; and configuring, by the UE, the corresponding RB according to the configuration message.

A fourth aspect of the present invention provides a service transmission system, which includes a first base station, an offload base station, and a UE, where:

the first base station is a base station that establishes an RRC connection with the UE, and the first base station includes a first sending unit and a second sending unit, where:

the first sending unit is configured to send a request message to the offload base station, where the request message includes at least one piece of service information, where the service information includes QoS information of a service and/or configuration information of an RB, the offload base station is at least one base station in base stations serving the UE, and the request message instructs the offload base station to perform resource configuration according to the at least one piece of service information; and the second sending unit is configured to send a configuration message to the UE, where the configuration message includes configuration list information of the RB and/or cell information of the offload base station, so that the UE configures the corresponding RB according to the configuration message;

the offload base station is a base station serving the UE, and the offload base station includes a second receiving unit and a second configuring unit, where:

the second receiving unit is configured to receive the request message sent by the first base station, where the request message includes the at least one piece of service information, where the service information includes the QoS information of the service and/or the configuration information of the RB, and the first base station is the base station that establishes the RRC connection with the UE; and the second configuring unit is configured to configure the resource configuration corresponding to the at least one piece of service information; and the UE includes a third receiving unit and a third configuring unit, where:

the third receiving unit is configured to receive the configuration message sent by the first base station, where the configuration message includes the configuration list information of the RB and/or the cell information of the offload base station, where the first base station is the base station that establishes the RRC connection with the UE, and the offload base station is the at least one base station serving the UE; and the third configuring unit is configured to configure the corresponding RB according to the configuration message.

In the foregoing technical solutions, a first base station sends a request message to an offload base station, where the request message includes at least one piece of service information, where the service information includes QoS information of a service and/or configuration information of an RB; the offload base station configures a resource configuration corresponding to the at least one piece of service information; the first base station sends a configuration message to the UE, where the configuration message includes configuration list information of the RB and/or cell information of the offload base station, so that the UE configures the RB corresponding to the configuration information. Thereby, the first base station may send the service of the UE to the offload base station, so that the offload base station sends the service to the UE. In this way, resources of the offload base station are utilized properly, and utilization of network resources is improved.

BRIEF DESCRIPTION OF THE DRAWINGS

FIG. 1 to FIG. 31 are schematic flowcharts or structural diagrams of embodiments of the present invention.

DETAILED DESCRIPTION

Figure 1:
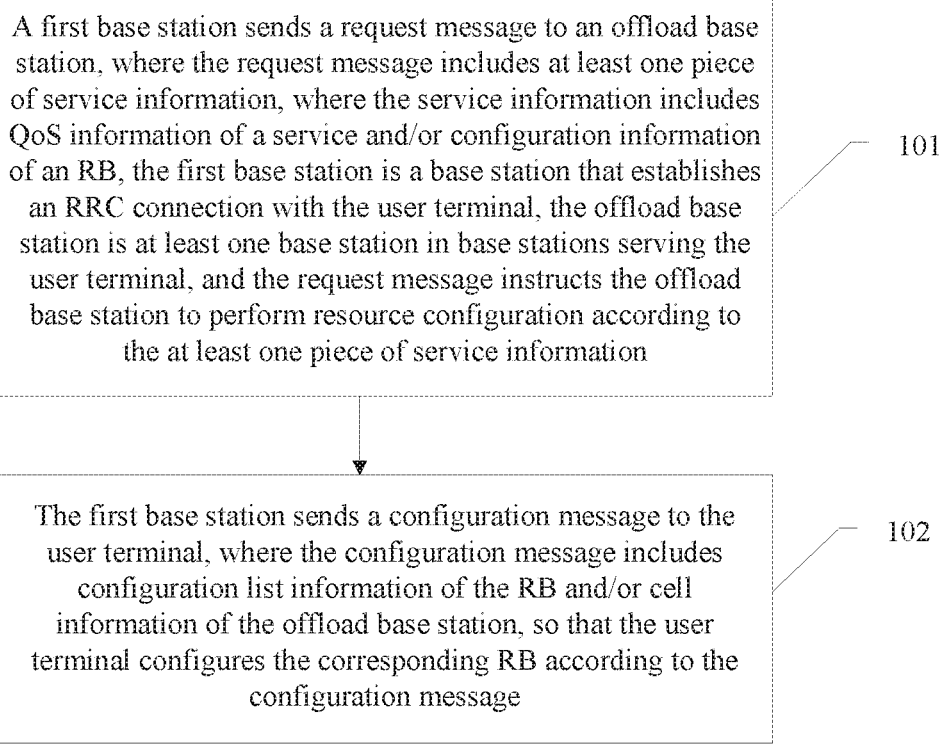

FIG. 1 is a schematic flowchart of a service transmission method according to an embodiment of the present invention. As shown in FIG. 1, the method includes the following:

101. A first base station sends a request message to an offload base station, where the request message includes at least one piece of service information, where the service information includes quality of service (QoS) information of a service and/or configuration information of an RB, the first base station is a base station that establishes an RRC connection with the UE, the offload base station is at least one base station in base stations serving the UE, and the request message instructs the offload base station to perform resource configuration according to the at least one piece of service information.

Optionally, the configuration information of the RB includes: configuration information of a PDCP layer, an RLC layer, a MAC layer, and a physical layer, or configuration information of an RLC layer, a MAC layer, and a physical layer.

In this way, the offload base station may configure the PDCP layer, RLC layer, MAC layer, and physical layer, or RLC layer, MAC layer, and physical layer of the RB corresponding to the at least one piece of service information.

Optionally, the service information may further include: at least one of configuration coordination information of radio resources of the RB, an identifier of the RB, an identifier of a radio access bearer (RAB), and offload indication information.

Optionally, the configuration coordination information of the radio resources of the RB includes at least one of a physical cell identifier, a logical cell identifier, a virtual cell identifier, frequency information, carrier information, radio resource block information, subcarrier information, subframe information, time-domain information, and space-domain information.

The offload indication information includes RB-based data offload information or packet-based data offload information.

Optionally, the RB-based data offload information indicates that the first base station sends service data unit (SDU) data of the PDCP layer of the service of the UE to the offload base station. Then after the offload base station receives the at least one piece of service information, the offload base station may perform the corresponding resource configuration according to the at least one piece of service information to configure the PDCP layer, RLC layer, Medium Access Control (MAC) layer, and physical layer of the RB corresponding to the at least one piece of service information. The packet-based data offload information indicates that the first base station sends service data unit (SDU) data of the RLC layer of the service of the UE to the offload base station. Then after the offload base station receives the at least one piece of service information, the offload base station may perform the corresponding resource configuration according to the at least one piece of service information to configure the RLC layer, MAC layer, and physical layer of the RB corresponding to the at least one piece of service information.

Optionally, when the offload indication information includes the packet-based data offload information, the offload base station performs the corresponding resource configuration according to the at least one piece of service information to configure the RLC layer, MAC layer, and physical layer of the RB corresponding to the at least one service, and then the first base station configures the PDCP layer, RLC layer, and physical layer of the RB.

Optionally, the offload base station in step 101 may be a plurality of offload base stations. Then sending, by the first base station, the at least one piece of service information to the plurality of offload base stations may specifically be sending, by the first station, the at least one piece of service information, which is the same, to the plurality of offload base stations, or sending, by the first base station, the at least one piece of service information, which is different, to the plurality of offload base stations.

In an optional implementation manner, the request message may further include: an identifier of the UE. In this implementation manner, the offload base station may be enabled to send the service to the UE more quickly.

In an optional implementation manner, after step 101, the method may further include the following:

The first base station defines an offload rule for data packets of the service of the UE, where the offload rule indicates a transmission base station for each data packet of the service of the UE, where the transmission base station is the first base station or the offload base station.

Specifically, when the resource configuration corresponding to the at least one piece of service information in step 101 is a resource configuration of the RLC layer, MAC layer, and physical layer, or when the configuration information of the RB includes configuration information of the RLC layer, MAC layer, and physical layer, or when the offload indication information includes packet-based data offload information, which indicates that the first base station sends SDU data of the RLC layer of the service of the UE to the offload base station while the service of the UE includes multiple data packets, the first base station may define an offload rule for the data packets of the service of the UE, where the offload rule indicates a transmission base station for each data packet of the service of the UE. For example, if the service of the UE includes four data packets, the offload rule may indicate that among the four data packets, even data packets are transmitted by the offload base station, and odd data packets are transmitted by the first base station.

102. The first base station sends a configuration message to the UE, where the configuration message includes configuration list information of the RB and/or cell information of the offload base station, so that the UE configures the corresponding RB according to the configuration message.

Optionally, after receiving the configuration message, the UE may configure the corresponding RB. When the configuration information of the RB in the at least one piece of service information includes the configuration information of the PDCP layer, RLC layer, MAC layer, and physical layer, the configuration message includes the configuration information of the PDCP layer, RLC layer, MAC layer, and physical layer of the RB corresponding to the at least one piece of service information, and the UE may configure the resource configuration corresponding to the offload base station, where the resource configuration specifically includes the PDCP layer, RLC layer, MAC layer, and physical layer of the RB corresponding to the at least one piece of service information. When the configuration information of the RB in the at least one piece of service information includes the configuration information of the RLC layer, MAC layer, and physical layer, the configuration information includes the configuration information of the PDCP layer, RLC layer, MAC layer, and physical layer of the RB corresponding to the at least one piece of service information, but in this case, the configuration information of the PDCP layer included in the configuration message corresponds to the first base station, while at least two pieces of configuration information of the RLC layer, MAC layer, and physical layer are included in the configuration message and respectively correspond to the first base station and the offload base station; and after receiving the configuration message, the UE may configure the PDCP layer, RLC layer, MAC layer, and physical layer of the RB corresponding to the at least one piece of service information, where at least two RLC entities, MAC entities, and physical entities are configured at the RLC layer, MAC layer, and physical layer and respectively correspond to the first base station and the offload base station.

In an optional implementation manner, the configuration list information of the RB includes:

the configuration list of the RB includes configuration information of at least one RB, where the configuration information of the RB includes at least one of the following items:

configuration information of a PDCP entity, configuration information of an RLC entity list, and MAC configuration information, a logical channel configuration message, and physical layer configuration information corresponding to each RLC entity in the RLC entity list; an identifier of the service; the offload indication information; the offload rule; and configuration information of radio resources.

Optionally, the configuration information of the radio resources may include: at least one of a physical cell identifier, a logical cell identifier, a virtual cell identifier, frequency information, carrier information, radio resource block information, subcarrier information, subframe information, time-domain information, and space-domain information.

It should be noted that: the request message sent to the offload base station in step 101 includes at least one piece of service information, and the offload base station performs the resource configuration of the at least one RB upon reception of the request message. Because the configuration list information of the RB includes the configuration information of the at least one RB. Therefore, the UE configures resources corresponding to the resource configuration of the at least one RB configured by the offload base station.

Optionally, after receiving the configuration information of the RB, the UE may perform the resource configuration, and specifically configure the PDCP layer, RLC layer, MAC layer, and physical layer of the RB corresponding to the at least one piece of service information, where at least two RLC entities, MAC entities, and physical entities are configured at the RLC layer, MAC layer, and physical layer and respectively correspond to the first base station and the offload base station. Alternatively, the UE configures the resource configuration corresponding to the offload base station, where the resource configuration specifically includes the PDCP layer, RLC layer, MAC layer, and physical layer of the RB corresponding to the at least one piece of service information.

In the foregoing technical solution, a first base station sends a request message to an offload base station, where the request message includes at least one piece of service information, where the service information includes QoS information of a service and/or configuration information of an RB; and the first base station sends a configuration message to a UE, where the configuration message includes configuration list information of the RB and/or cell information of the offload base station, so that the UE configures the corresponding RB according to the configuration message. In this way, the service of the UE may be sent to the UE through the first base station and/or offload base station. In comparison with the prior art in which the service is sent to the UE uniformly by one base station, in the present invention, resources of the first base station and offload base station may be utilized properly, and utilization of network resources is improved.

FIG. 2 is a schematic flowchart of another service transmission method according to an embodiment of the present invention. As shown in FIG. 2, the method includes the following:

201. A first base station sends a request message to an offload base station, where the request message includes at least one piece of service information, where the service information includes QoS information of a service and/or configuration information of an RB, the first base station is a base station that establishes an RRC connection with the UE, the offload base station is at least one base station in base stations serving the UE, and the request message instructs the offload base station to perform resource configuration according to the at least one piece of service information.

202. The first base station receives a response message returned by the offload base station, where the response message includes an identifier of the UE, and a status message and/or an indication message; where the status message includes a status message for rejecting the request message, or a status message for receiving the request message, or a status message for modifying the request message; and the indication message includes an identifier and/or configuration information of an RB whose resource configuration is accepted and/or an identifier of a corresponding RAB, and/or an identifier and/or configuration information of an RB whose resource configuration is rejected and/or an identifier of a corresponding RAB.

Optionally, after the offload base station receives the request message, the offload base station may return a response message to the first base station according to a resource status and/or load condition of the offload base station, where the response message includes the identifier of the UE, and the status message and/or the indication message. By performing step 202, network resources may be maximized.

Optionally, the status message is used to indicate whether the offload base station receives the request message sent by the first base station. A specific case may be that the request message is received, that is, the resource configuration indicated in the request message is configured, and in this case, the status message is specifically the status message for receiving the request message. The status message may also be that the request message sent by the first base station is rejected, that is, the resource configuration in the request message is not configured, and in this case, the status message is specifically the status message for rejecting the request message. The status message may also be that the request message is modified, that is, only a part of the resource configuration in the request message is configured, and in this case, the status message is specifically the status message for modifying the request message, and the status message may specifically include an identifier and/or configuration information of an RB whose resource configuration is accepted and/or an identifier of a corresponding RAB. In this way, after receiving the status message, the first base station learns that the offload base station accepts the resource configuration.

Optionally, the indication message is specifically used to indicate an RB whose resource configuration is received by the offload base station or an RB whose resource configuration is rejected, and may specifically include the identifier and/or configuration information of the RB whose resource configuration is accepted by the offload base station and/or the identifier of the corresponding RAB, and/or the identifier and/or configuration information of the RB whose resource configuration is rejected and/or the identifier of the corresponding RAB. Assuming that the request message includes resource configurations of two RBs, after the offload base station receives the request message, the offload base station determines, according to the resource status and/or load condition of the offload base station, whether to configure the resource configurations of the two RBs in the request message. For example, when the resource configuration of only one RB is allowed to be configured according to the resource status and/or load condition of the offload base station, the indication message includes an identifier and/or configuration information of an RB whose resource configuration is accepted and/or an identifier of a corresponding RAB, and/or an identifier and/or configuration information of an RB whose resource configuration is rejected and/or an identifier of a corresponding RAB. The indication message may specifically be a list. For example, an identifier and/or configuration information of an RB and/or an identifier of a corresponding RAB in each second list in the list is used to indicate an RB whose resource configuration is received, and an identifier and/or configuration information of an RB and/or an identifier of a corresponding RAB in each third list in the list is used to indicate an RB whose resource configuration is rejected.

Optionally, after the first base station receives the response message returned by the offload base station, the RB whose resource configuration is rejected in the response message may be configured, and the resource configuration of the RB may be specifically configured by the first base station; or the first base station sends a request message corresponding to the resource configuration of the RB to another offload base station, so that the another offload base station configures the resource configuration of the RB.

203. The first base station sends a configuration message to the UE, where the configuration message includes configuration list information of the RB and/or cell information of the offload base station, so that the UE configures the corresponding RB according to the configuration message.

In an optional implementation manner, the method may further include the following: The first base station sends the service of the UE to the offload base station, so that the offload base station sends the service to the UE.

In this way, the service of the UE may be sent by multiple base stations.

Optionally, when step 202 does not exist, the method may also include step 204.

In an optional implementation manner, after step 203, the method may further include the following: The first base station sends a cross-cell or cross-carrier scheduling indication and the cell information of the offload base station to the UE within a previous on-duration in which the UE wakes to monitor a physical downlink control channel before the offload base station sends the service to the UE, so that the UE monitors a cell that belongs to the offload base station.

Optionally, before the UE receives the service sent by a network side, the network side configures a discontinuous reception (DRX) parameter for the UE, where the parameter indicates an on-duration or sleep time of the UE in a DRX cycle. For example, a DRX cycle is 30 ms, and the parameter may indicate that the on-duration of the UE is 5 ms, and that the sleep time is 25 ms, that is, in a DRX cycle, it takes only 5 ms for the UE to monitor a physical downlink control channel of a cell. Because by default, the UE monitors a cell that belongs to the first base station within an on-duration, the first base station sends a cross-cell or cross-carrier scheduling indication and the cell information of the offload base station corresponding to the scheduling indication to the UE within a previous on-duration of the UE before the offload base station sends the service to the UE, so that the UE monitors a cell that belongs to the offload base station within a next on-duration.

Optionally, the first base station may calculate, according to the resource configuration configured by the offload base station, the time of sending data to the UE by the offload base station; or before the offload base station sends data to the UE, the first base station receives an indication message sent by the offload base station, and after receiving the indication message, the first base station sends a cross-cell or cross-carrier scheduling indication and the cell information of the offload base station corresponding to the scheduling indication to the UE within the previous on-duration of the UE before the offload base station sends the service to the UE, so that the UE monitors the cell that belongs to the offload base station.

In an optional implementation manner, when there are multiple offload base stations, and the offload base stations have different working frequencies, after step 201, the method may further include the following: the first base station configures a DRX parameter for the UE for each working frequency channel number of the offload base stations. Because the offload base stations have different working frequency channel numbers, the UE may have multiple radio frequencies, and each radio frequency matches each working frequency channel number of the offload base stations. After the UE receives the DRX parameter configured by the first base station, each radio frequency unit of the UE may enter different on-durations and sleep time, which may save power consumption.

In the foregoing technical solution, on the basis of the foregoing embodiment, a step of receiving, by the first base station, a response message returned by the offload base station, is added. In this way, the offload base station determines, according to the resource status and/or load condition of the offload base station, whether establishment of the RB in the request message sent by the first base station may be accepted. Thereby, network resources of the offload base station may be maximized, and utilization of network resources may be improved.

Figure 3:
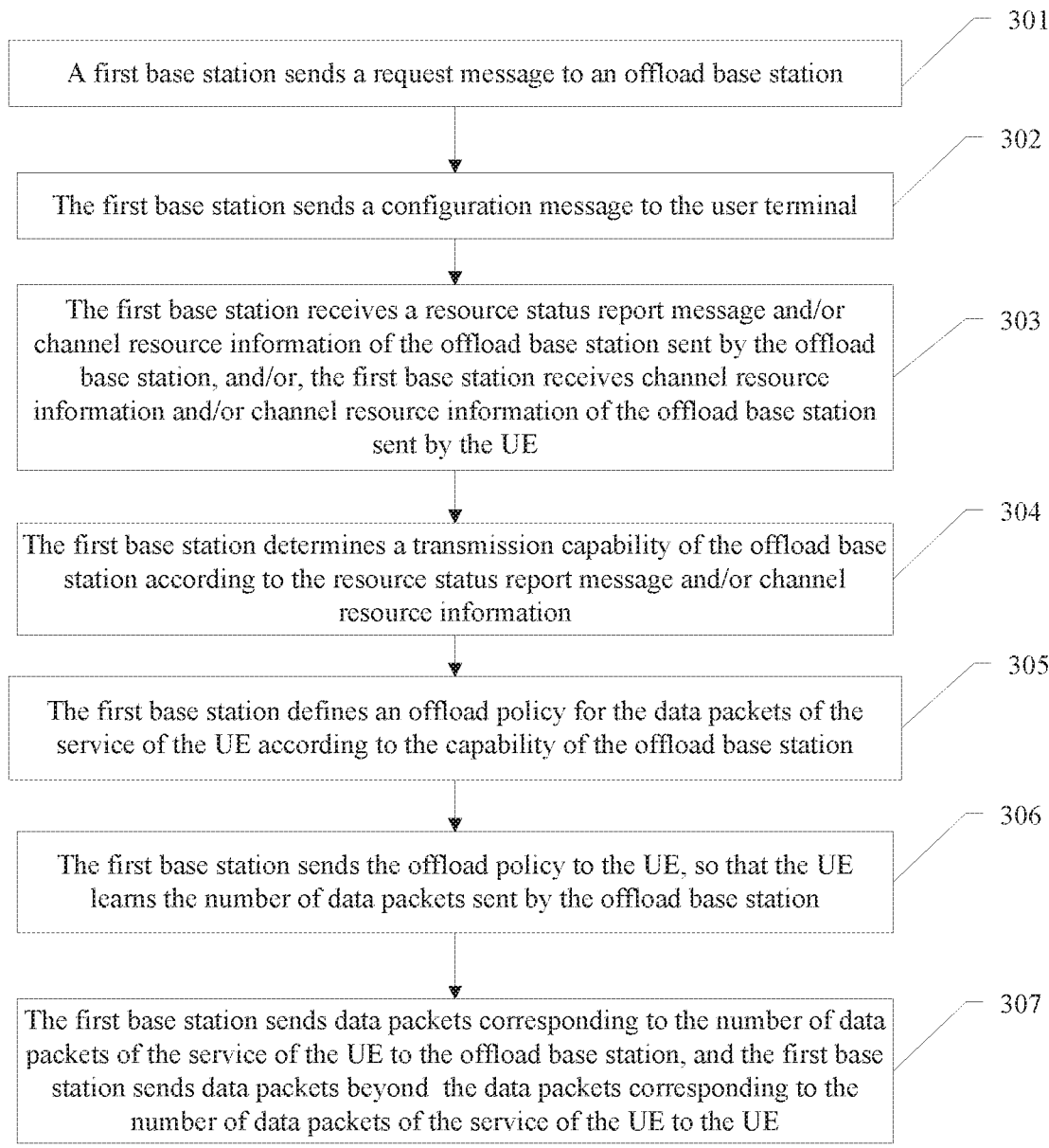

FIG. 3 is a schematic flowchart of another service transmission method according to an embodiment of the present invention. As shown in FIG. 3, the method includes following steps.

301. A first base station sends a request message to an offload base station, where the request message includes at least one piece of service information, where the service information includes QoS information of a service and/or configuration information of an RB, the first base station is a base station that establishes an RRC connection with the UE, the offload base station is at least one base station in base stations serving the UE, and the request message instructs the offload base station to perform resource configuration according to the at least one piece of service information.

Optionally, the configuration information of the RB may specifically include configuration information of an RLC layer, a MAC layer, and a physical layer of the RB. Specifically, the first base station may send SDU data of the RLC layer of the service of the UE to the offload base station.

302. The first base station sends a configuration message to the UE, where the configuration message includes configuration list information of the RB and/or cell information of the offload base station, so that the UE configures the corresponding RB according to the configuration message.

Optionally, step 302 may be executed before step 303, or may also be executed at the same time with any one of steps 303, 304, and 305, or may also be executed after step 305 and before step 306.

303. The first base station receives a resource status report message and/or channel resource information of the offload base station sent by the offload base station, and/or, the first base station receives a resource status report message and/or channel resource information of the offload base station sent by the UE; where the resource status report message includes the number of data packets that can be sent and/or the number of data packets waiting to be sent in a buffer, and the channel resource includes at least one of a channel quality indicator (CQI), a precoding matrix indicator (PMI), and a rank indicator (RI).

Optionally, the number of sent data packets may be specifically the number of data packets sent within a future specific time.

Optionally, step 303 may further include the following: The first base station receives a resource status report and/or channel resource information of the first base station sent by the UE, or the first base station receives a resource status report and/or channel resource information of each cell that belongs to the first base station sent by the UE.

Optionally, step 303 may be specifically that: the first base station receives a resource status report message and/or channel resource information of each cell that belongs to the offload base station sent by the offload base station, and/or the first base station receives a resource status report message and/or channel resource information of each cell that belongs to the offload base station sent by the UE.

304. The first base station determines a transmission capability of the offload base station according to the resource status report message and/or channel resource information.

Optionally, step 304 may specifically be calculating a transmission capability of each cell that belongs to the offload base station.

305. The first base station defines an offload policy for the data packets of the service of the UE according to the capability of the offload base station, where the offload policy indicates the number of data packets sent by the offload base station to the UE within a specific time.

Optionally, when there are multiple offload base stations, the offload policy indicates the number of data packets sent by each offload base station to the UE within a specific time.

Assuming that the service of the UE includes service 1, while service information corresponding to service 1 is separately sent to two offload base stations, the offload policy may indicate transmission according to transmission capabilities of the two offload base stations, for example, instruct one of the two offload base stations to send ⅔ data packets, and the other offload base station to send ⅓ data packets.

Assuming that when service information of the service, including service 1, of the UE, is sent to at least one offload base station, while resource information corresponding to the service information includes the configuration information of the RLC layer, MAC layer, and physical layer, that is, the first base station sends the SDU data of the RLC layer of the service of the UE to the offload base station, defining an offload policy for the service in step 305 may specifically be defining the offload policy according to the transmission capability of the first base station and the transmission capability of the offload base station. For example, when the transmission capability of the offload base station is better than that of the first base station, the offload policy indicates that the number of data packets of the service transmitted by the offload base station is greater than the number of data of the service transmitted by the first base station.

306. The first base station sends the offload policy to the UE, so that the UE learns the number of data packets sent by the offload base station.

Optionally, when the UE receives the offload policy, if the UE receives an offload rule (refer to the first embodiment) before receiving the offload policy, the UE replaces the offload rule with the offload policy.

307. The first base station sends data packets corresponding to the number of data packets of the service of the UE to the offload base station, and the first base station sends data packets beyond the data packets corresponding to the number of data packets of the service of the UE to the UE.

In the foregoing technical solution, by defining an offload policy, the number of data packets of a service of a UE transmitted by the offload base station may be determined dynamically according to resource information of a base station to which an RB belongs. Therefore, network resources may be utilized properly, and utilization of the network resources is improved.

Figure 4:
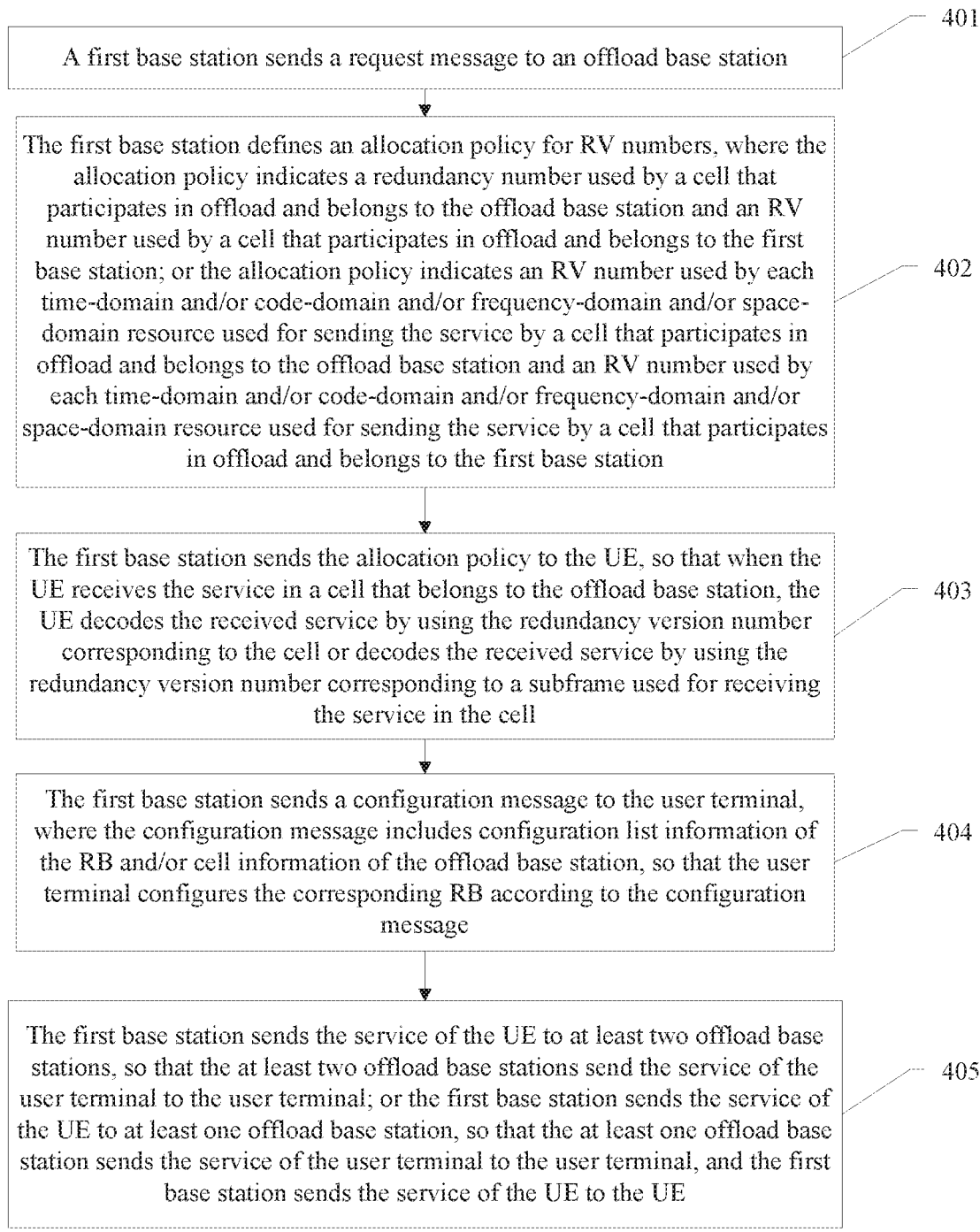

FIG. 4 is a schematic flowchart of another service transmission method according to an embodiment of the present invention. As shown in FIG. 4, the method includes the following:

401. A first base station sends a request message to an offload base station, where the request message includes at least one piece of service information, where the service information includes QoS information of a service and/or configuration information of an RB, the first base station is a base station that establishes an RRC connection with the UE, the offload base station is at least one base station in base stations serving the UE, and the request message instructs the offload base station to perform resource configuration according to the at least one piece of service information.

Optionally, there are multiple offload base stations. The resource configuration of the RB corresponding to the at least one piece of service information includes resource configurations of an RLC layer, a MAC layer, and a physical layer of the RB, for example, the configuration information of the RB includes configuration information of the RLC layer, MAC layer, and physical layer of the RB.

Optionally, the configuration information of the RB indicates that data sent by the offload base station is the same as data sent by the first base station and/or another offload base station.

402. The first base station defines an allocation policy for redundancy version (RV) numbers, where the allocation policy indicates a redundancy version number used by a cell that participates in offload and belongs to the offload base station and an RV number used by a cell that participates in offload and belongs to the first base station; or the allocation policy indicates an RV number used by each time-domain and/or code-domain and/or frequency-domain and/or space-domain resource used for sending the service by a cell that participates in offload and belongs to the offload base station and an RV number used by each time-domain and/or code-domain and/or frequency-domain and/or space-domain resource used for sending the service by a cell that participates in offload and belongs to the first base station.

The time-domain resource may be, for example, subframe information; the frequency-domain resource may be, for example, subcarrier information, and/or subcarrier group information and/or center frequency information and/or carrier information and/or physical radio resource block information.

Optionally, after the offload base station receives the service sent by the first base station, the offload base station may encode the service by using the RV number. However, multiple cells may belong to the offload base station. The allocation policy defined in step 402 indicates an RV number used by each cell that belongs to the offload base station. When there are multiple offload base stations, the allocation policy may indicate an RV number used by each cell that belongs to each offload base station. Assuming that base stations to which RBs corresponding to the service of the UE belong, include the first base station and an offload base station 1, while cells that belong to the first base station include a cell 1 and a cell 2, and cells that belong to the offload base station 1 include a cell 3 and a cell 4, the allocation policy defined in step 402 may indicate that: the RV number used by the cell 1 is 0, the RV number used by the cell 2 is 2, the RV number used by the cell 3 is 3, and the RV number used by the cell 4 is 1.

Optionally, the subframe may specifically be a corresponding subframe of the service, which is encoded by the offload base station. Because the encoding process may be considered as a part of a process of sending the service by the offload base station to the UE, the subframe may specifically be a subframe for sending the service to the UE by the offload base station. Assuming that the resource configuration of the RB corresponding to the at least one piece of service information includes resource configurations of the RLC layer, MAC layer, and physical layer of the RB, in this case, the first base station configures resource configurations of the PDCP layer, RLC layer, MAC layer, and physical layer of the RB; that is, the service of the UE is sent to the UE by using the first base station and the offload base station. However, cells that belong to the first base station include a cell 1, and cells that belong to the offload base station include a cell 2. Therefore, the allocation policy defined in step 402 may indicate that: the RV number used by a subframe 1 of the cell 1 is 0, the RV number used by a subframe 2 of the cell 1 is 2, the RV number used by a subframe 3 of the cell 2 is 3, and the RV number used by a subframe 4 of the cell 2 is 1.

403. The first base station sends the allocation policy to the UE, so that when the UE receives the service in a cell that belongs to the offload base station or the first base station, the UE decodes the received service by using the RV number corresponding to the cell or decodes the received service by using the RV number corresponding to the time-domain and/or code-domain and/or frequency-domain and/or space-domain resource used for receiving the service in the cell. The time-domain resource may be, for example, subframe information; the frequency-domain resource may be, for example, subcarrier information, and/or subcarrier group information and/or center frequency information and/or carrier information and/or physical radio resource block information.

404. The first base station sends a configuration message to the UE, where the configuration message includes configuration list information of the RB and/or cell information of the offload base station, so that the UE configures the corresponding RB according to the configuration message.

Optionally, the information sent in steps 403 and 404 may be included in a same message.

405. The first base station sends the service of the UE to at least two offload base stations, so that the at least two offload base stations send the service of the UE to the UE; or the first base station sends the service of the UE to at least one offload base station, so that the at least one offload base station sends the service of the UE to the UE, and the first base station sends the service of the UE to the UE.

Optionally, the service sent to the at least two offload base stations in step 405 may be the same. In addition, the service sent to the at least one offload base station may also be the same, and the service sent by the first base station to the UE may also be the same as the service sent to the at least one offload base station. In this way, multiple base stations may send the same service to the UE. In comparison with the prior art in which a base station sends a service to the UE for multiple times, in the present invention, resources of multiple base stations may be utilized properly.

In the foregoing technical solution, on the basis of the foregoing embodiment, the following steps are added: An allocation policy for RV numbers is defined; and when the offload base station and the first base station send a service to the UE, encoding is performed according to the allocation policy. Therefore, at least two base stations may send services to the UE, and the services sent by the base stations are the same. In comparison with the prior art in which a base station sends a service to the UE for multiple times, in this embodiment of the present invention, resources of each offload base station may be better utilized.

FIG. 5 is a schematic flowchart of another service transmission method according to an embodiment of the present invention. As shown in FIG. 5, the method includes the following:

501. A first base station sends a request message to an offload base station, where the request message includes at least one piece of service information, where the service information includes QoS information of a service and/or configuration information of an RB, the first base station is a base station that establishes an RRC connection with the UE, the offload base station is at least one base station in base stations serving the UE, and the request message instructs the offload base station to establish the RB corresponding to the at least one piece of service information.

502. The first base station sends a configuration message to the UE, where the configuration message includes configuration list information of the RB corresponding to the service and/or cell information of the offload base station, so that the UE configures the corresponding RB according to the configuration message.

For details about steps 501 and 502, refer to the implementation manner provided by the foregoing embodiment.

503. The first base station configures a measurement gap GAP parameter of the UE.

In an optional implementation manner, the GAP parameter may specifically include:

at least one of a mode of the GAP, a measurement period of the GAP, the number of measurements within a specific period of the GAP, and a start position of the GAP.

504. The first base station sends a measurement notification message to the offload base station, where the measurement notification message includes an identifier of the UE, the GAP parameter, and start time information of the GAP, and the measurement notification message is used to notify the offload base station of measurement configuration information of at least one UE whose service is offloaded by the base station.

When the offload base station receives the service sent by the first base station, the offload base station is forbidden to send the service to the UE when the GAP starts. Therefore, the offload base station sends the service to the UE within a time when the UE monitors a cell on a network side, so that the service sent by the offload base station can be received by the UE.

505. The first base station sends the GAP parameter to the UE.

In this way, the UE may perform corresponding monitoring according to the GAP parameter to save power consumption.

In an optional implementation manner, the method may specifically further include the following:

the first base station sends the service of the UE to the offload base station; and/or the first base station receives a response message returned by the offload base station; and/or the first base station defines an offload rule for data packets of the service of the UE; and/or the first base station receives a resource status report message and/or channel resource information of the offload base station sent by the offload base station, and/or, the first base station receives channel resource information of the offload base station sent by the UE;

the first base station determines a transmission capability of the offload base station according to the resource status report message and/or channel resource information;

the first base station defines an offload policy for the data packets of the service of the UE according to the capability of the offload base station, where the offload policy indicates the number of data packets sent by the offload base station to the UE within a specific time;

the first base station sends the offload policy to the UE, so that the UE replaces the offload rule with the offload policy;

the first base station sends data packets corresponding to the number of data packets of the service of the UE to the offload base station;

the first base station sends data packets beyond the data packets corresponding to the number of data packets of the service of the UE to the UE; and/or the first base station defines an allocation policy for redundancy version numbers;

the first base station sends the allocation policy to the UE; and the first base station sends the service of the UE to at least two offload base stations, or the first base station sends the service of the UE to at least one offload base station, and the first base station sends the service of the UE to the UE.

For a specific execution time relationship of the foregoing steps, refer to the foregoing embodiment.

In the foregoing technical solution, on the basis of the foregoing embodiment, steps of configuring a GAP parameter and sending a measurement notification message to the offload base station and sending the GAP parameter to the UE are added; the offload base station sends the service to the UE only within a time when the UE monitors a cell on a network side, so that the service sent by the offload base station can be received by the UE, and in addition, utilization of network resources is improved.

FIG. 6 is a schematic flowchart of another service transmission method according to an embodiment of the present invention. As shown in FIG. 6, the method includes the following:

601. An offload base station receives a request message sent by a first base station, where the request message includes at least one piece of service information, where the service information includes QoS information of a service and/or configuration information of an RB, the first base station is a base station that establishes an RRC connection with the UE, and the offload base station is a base station serving the UE.

Optionally, the configuration information of the RB includes: configuration information of a PDCP layer, an RLC layer, a MAC layer, and a physical layer, or configuration information of an RLC layer, a MAC layer, and a physical layer.

Optionally, the service information may further include: at least one of configuration coordination information of radio resources of the RB, an identifier of the RB, an identifier of a radio access bearer (RAB), and offload indication information.

Optionally, the configuration coordination information of the radio resources of the RB includes at least one of a physical cell identifier, a logical cell identifier, a virtual cell identifier, frequency information, carrier information, radio resource block information, subcarrier information, subframe information, time-domain information, and space-domain information.

The offload indication information includes RB-based data offload information or packet-based data offload information.

Optionally, the RB-based data offload information indicates that the first base station sends SDU data of the PDCP layer of the service of the UE to the offload base station.

Then after the offload base station receives the at least one piece of service information, the offload base station may perform the corresponding resource configuration according to the at least one piece of service information to configure the PDCP layer, RLC layer, MAC layer, and physical layer of the RB corresponding to the at least one piece of service information. The packet-based data offload information indicates that the first base station sends SDU data of the RLC layer of the service of the UE to the offload base station. Then after the offload base station receives the at least one piece of service information, the offload base station may perform the corresponding resource configuration according to the at least one piece of service information to configure the RLC layer, MAC layer, and physical layer of the RB corresponding to the at least one piece of service information.

Optionally, when the offload indication information includes the packet-based data offload information, the offload base station configures, according to the at least one piece of service information, the RLC layer, MAC layer, and physical layer of the RB corresponding to the at least one piece of service information, and then the first base station configures the PDCP layer, RLC layer, MAC layer, and physical layer of the RB.

In an optional implementation manner, the request message may further include: an identifier of the UE.

602. The offload base station configures a resource configuration corresponding to the at least one piece of service information.

Optionally, the offload base station may specifically configure the PDCP layer, RLC layer, MAC layer, and physical layer, or RLC layer, MAC layer, and physical layer of the RB corresponding to the at least one piece of service information.

In the foregoing technical solution, an offload base station receives a request message sent by a first base station, and configures a resource configuration corresponding to at least one piece of service information in the request message. In this way, resources of the offload base station are utilized properly, and utilization of network resources is improved.

Figure 7:
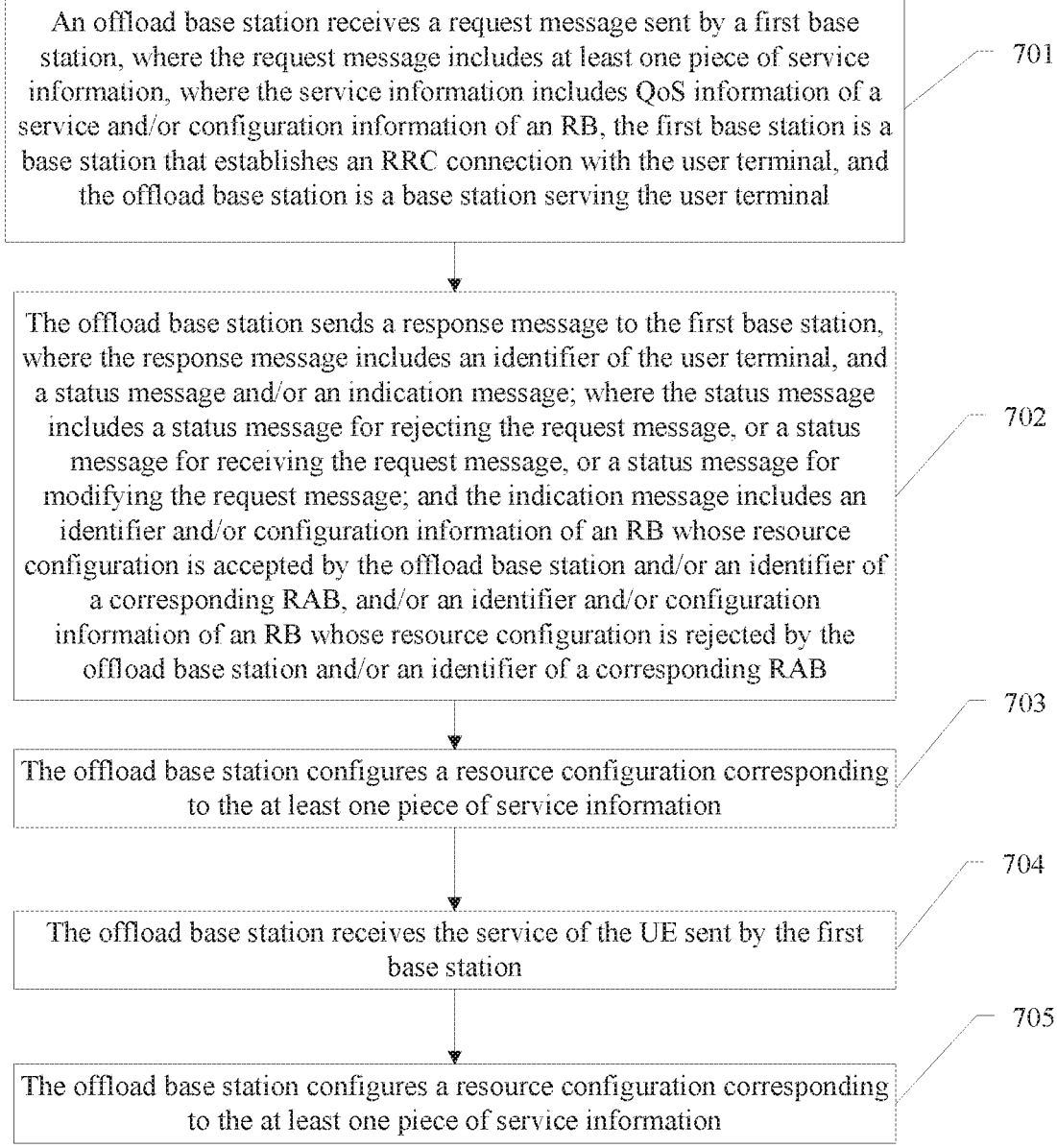

FIG. 7 is a schematic flowchart of another service transmission method according to an embodiment of the present invention. As shown in FIG. 7, the method includes the following:

701. An offload base station receives a request message sent by a first base station, where the request message includes at least one piece of service information, where the service information includes QoS information of a service and/or configuration information of an RB, the first base station is a base station that establishes an RRC connection with the UE, and the offload base station is a base station serving the UE.

702. The offload base station sends a response message to the first base station, where the response message includes an identifier of the UE, and a status message and/or an indication message; where the status message includes a status message for rejecting the request message, or a status message for receiving the request message, or a status message for modifying the request message; and the indication message includes an identifier and/or configuration information of an RB whose resource configuration is accepted by the offload base station and/or an identifier of a corresponding RAB, and/or an identifier and/or configuration information of an RB whose resource configuration is rejected by the offload base station and/or an identifier of a corresponding RAB.

Optionally, after the offload base station receives the request message, the offload base station may return a response message to the first base station according to a resource status and/or load condition of the offload base station, where the response message includes the identifier of the UE, and the status message and/or the indication message. By performing step 702, network resources may be maximized.

703. The offload base station configures a resource configuration corresponding to the at least one piece of service information.

704. The offload base station receives the service of the UE sent by the first base station.

Optionally, when the resource configuration includes a PDCP layer, an RLC layer, a MAC layer, and a physical layer, step 703 may be specifically receiving SDU data of the PDCP layer of the service of the UE sent by the first base station; or when the resource configuration includes an RLC layer, a MAC layer, and a physical layer, step 703 may be specifically receiving SDU data of the RLC layer of the service of the UE sent by the first base station.

The offload base station receives the service of the UE sent by the first base station (for example, the SDU data of the PDCP layer or RLC layer). In comparison with the prior art in which the service sent by the first base station is received at the physical layer, this solution reduces a delay and improves service transmission efficiency.

705. The offload base station configures a resource configuration corresponding to the at least one piece of service information.

Optionally, when this embodiment does not include step 702, steps in this embodiment are also feasible.

In an optional implementation manner, before step 705, the method may further include the following: The offload base station sends indication information to the first base station, where the indication information instructs the first base station to send a cross-cell or cross-carrier scheduling indication and an identifier of the offload base station to the UE within a previous on-duration of the UE before the offload base station sends the service to the UE, so that the UE monitors a cell that belongs to the offload base station.

In an optional implementation manner, the method may further include: receiving the service sent by the UE.

In the foregoing technical solution, on the basis of the foregoing embodiment, the following steps are added: The offload base station receives a service sent by the first base station, and sends the service to the UE; and the offload base station receives the service of the UE sent by the first base station (for example, SDU data of the PDCP layer or RLC layer). In comparison with the prior art in which the service sent by the first base station is received at the physical layer, this solution reduces a delay and improves service transmission efficiency. In addition, resources of the offload base station may be utilized properly, and utilization of network resources is improved.

Figure 8:
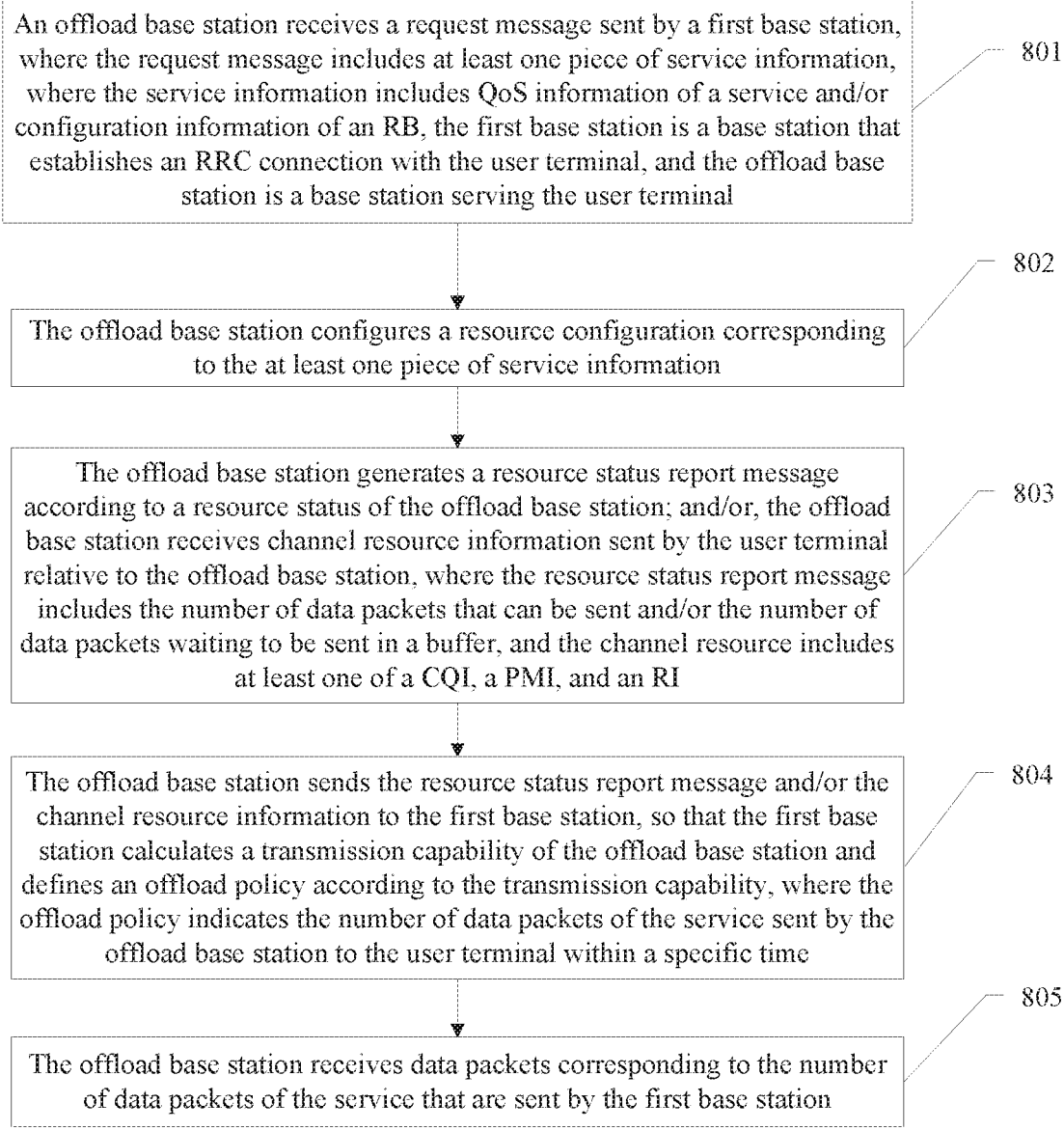

FIG. 8 is a schematic flowchart of another service transmission method according to an embodiment of the present invention. As shown in FIG. 8, the method includes following steps.

801. An offload base station receives a request message sent by a first base station, where the request message includes at least one piece of service information, where the service information includes QoS information of a service and/or configuration information of an RB, the first base station is a base station that establishes an RRC connection with the UE, and the offload base station is a base station serving the UE.

Optionally, the configuration information of the RB may specifically include configuration information of an RLC layer, a MAC layer, and a physical layer of the RB. Specifically, the first base station may send SDU data of the RLC layer of the service of the UE to the offload base station, and the offload base station may configure the RLC, MAC layer, and physical layer of the RB upon reception of the configuration information of the RB. In addition, the offload base station may also configure the RLC, MAC layer, and physical layer of the RB according to the QoS information of the service.

802. The offload base station configures a resource configuration corresponding to the at least one piece of service information.

Optionally, the configuration information may specifically include the RLC layer, MAC layer, and physical layer.

803. The offload base station generates a resource status report message according to the offload base station; and/or, the offload base station receives channel resource information sent by the UE relative to the offload base station, where the resource status report message includes the number of data packets that can be sent and/or the number of data packets waiting to be sent in a buffer, and the channel resource includes at least one of a CQI, a PMI, and an RI.

Optionally, the number of sent data packets is the number of data packets sent within a future specific time.

804. The offload base station sends the resource status report message and/or the channel resource information to the first base station, so that the first base station calculates a transmission capability of the offload base station and defines an offload policy according to the transmission capability, where the offload policy indicates the number of data packets of the service sent by the offload base station to the UE within a specific time.

Optionally, when the resource status report message and/or the channel resource information of the offload base station indicates that the transmission capability of the offload base station is better than a transmission capability of the first base station, or better than a transmission capability of another offload base station, the offload policy indicates that, within the specific time, the number of data packets of the service sent by the offload base station to the UE is greater than the number of data packets of the service sent by the first base station to the UE, or greater than the number of data packets of the service sent by the another offload base station to the UE.

805. The offload base station receives data packets corresponding to the number of data packets of the service that are sent by the first base station.

Optionally, step 805 may be specifically that the offload base station receives, at the RLC layer, data packets corresponding to the number of data packets of the service that are sent by the first base station. After receiving the data packets, the offload base station sends the data packets to the UE.

In the foregoing technical solution, on the basis of the foregoing embodiment, the following steps are added: The offload base station sends a resource status report message and/or channel resource information to the first base station, so that the first base station calculates a transmission capability of the offload base station and defines an offload policy according to the capability of the offload base station; the offload base station then receives data packets sent by the first base station according to the offload policy. In this way, resources of the offload base station may be utilized properly, and utilization of network resources is improved.

Figure 9:
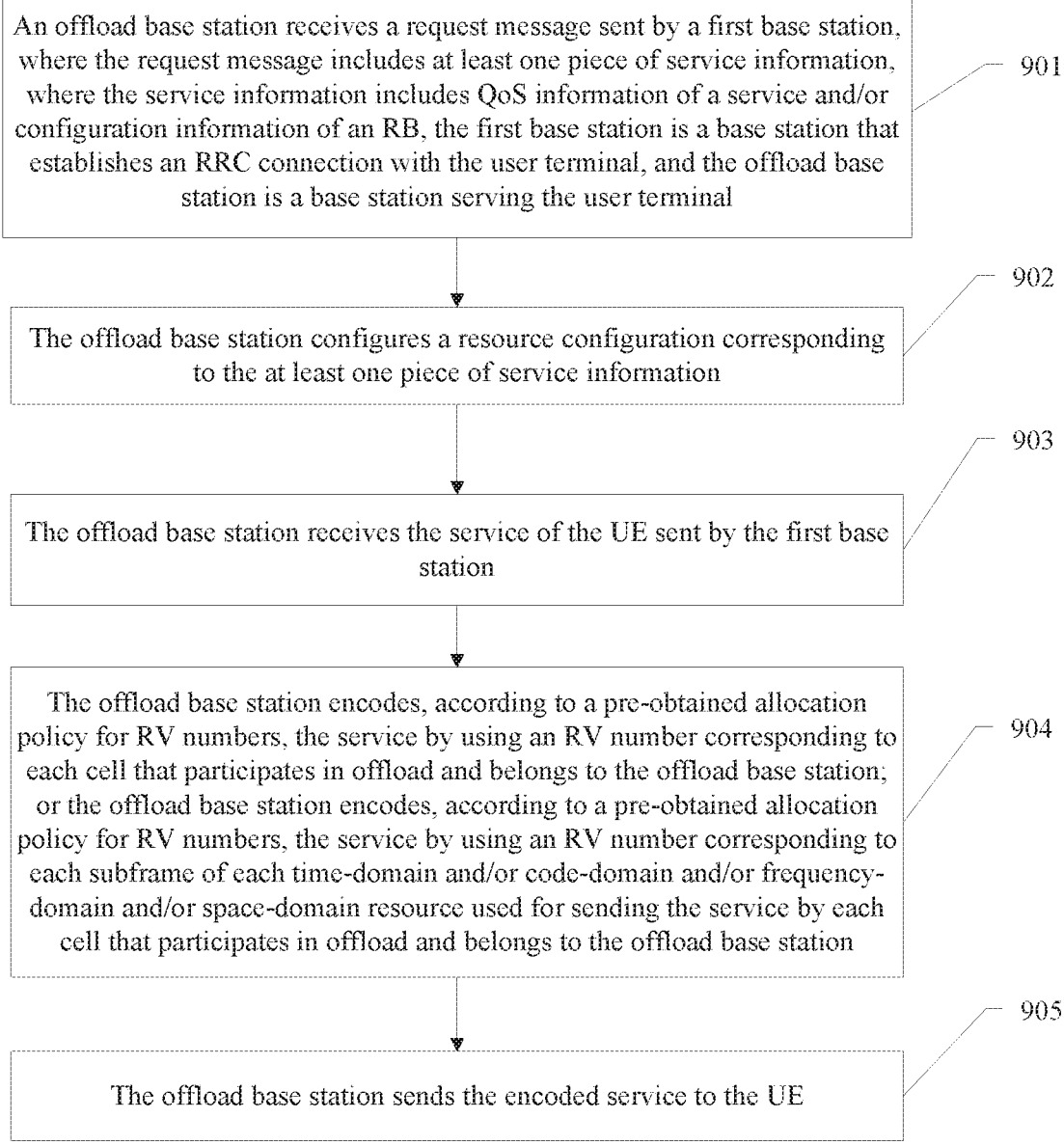

FIG. 9 is a schematic flowchart of another service transmission method according to an embodiment of the present invention. As shown in FIG. 9, the method includes following steps.

901. An offload base station receives a request message sent by a first base station, where the request message includes at least one piece of service information, where the service information includes QoS information of a service and/or configuration information of an RB, the first base station is a base station that establishes an RRC connection with the UE, and the offload base station is a base station serving the UE.

902. The offload base station configures a resource configuration corresponding to the at least one piece of service information.

Optionally, the configuration information may specifically include configurations of an RLC layer, a MAC layer, and a physical layer.

903. The offload base station receives the service of the UE sent by the first base station.

904. The offload base station encodes, according to a pre-obtained allocation policy for RV numbers, the service by using an RV number corresponding to a cell that participates in offload and belongs to the offload base station; or the offload base station encodes, according to a pre-obtained allocation policy for RV numbers, the service by using an RV number corresponding to each time-domain and/or code-domain and/or frequency-domain and/or space-domain resource used for sending the service by a cell that participates in offload and belongs to the offload base station.

The allocation policy indicates the RV number used by the cell that participates in offload and belongs to the offload base station; or the allocation policy indicates the RV number used by each time-domain and/or code-domain and/or frequency-domain and/or space-domain resource used for sending the service by the cell that participates in offload and belongs to the offload base station.

Optionally, the offload base station receives, before step 904, the allocation policy for RV numbers that is sent by the first base station, where the allocation policy indicates the RV number used by the cell that participates in offload and belongs to the offload base station; or the allocation policy indicates the RV number used by each time-domain and/or code-domain and/or frequency-domain and/or space-domain resource used for sending the service by the cell that participates in offload and belongs to the offload base station.

Optionally, multiple cells belong to the offload base station. When receiving the service sent by the first base station, the offload base station determines which cell is used to send the service to the UE, and encodes the service in the sending process by using the RV number corresponding to the cell, so that the UE may decode the received service by using the corresponding RV number.

Optionally, the cell that belongs to the offload base station may send the service to the UE for multiple times. In this case, the UE may encode the service by using the RV number corresponding to the time-domain and/or code-domain and/or frequency-domain and/or space-domain resource (for example, a subframe or a frequency) of the service sent each time.

905. The offload base station sends the encoded service to the UE.

In the foregoing technical solution, on the basis of the foregoing embodiment, the following steps are added: An allocation policy for RV numbers is defined; and when the offload base station and the first base station send a service to the UE, encoding is performed according to the allocation policy. In this way, multiple base stations may send the same service to the UE, and resources of each base station serving the UE are utilized properly, so that utilization of network resources is improved.

Figure 10:
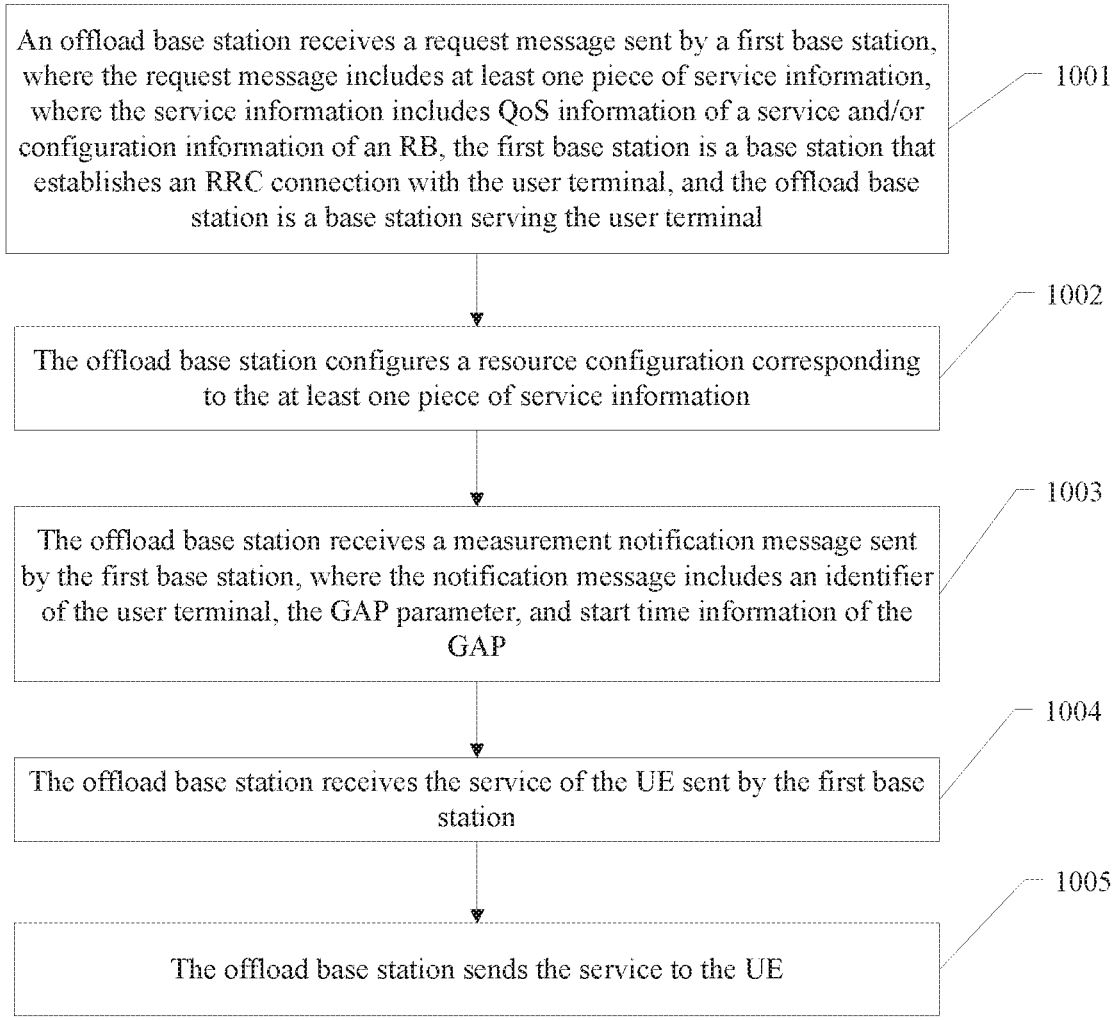

FIG. 10 is a schematic flowchart of another service transmission method according to an embodiment of the present invention. As shown in FIG. 10, the method includes following steps.

1001. An offload base station receives a request message sent by a first base station, where the request message includes at least one piece of service information, where the service information includes QoS information of a service and/or configuration information of an RB, the first base station is a base station that establishes an RRC connection with the UE, and the offload base station is a base station serving the UE.

1002. The offload base station configures a resource configuration corresponding to the at least one piece of service information.

1003. The offload base station receives a measurement notification message sent by the first base station, where the measurement notification message includes an identifier of the UE, the GAP parameter, and start time information of the GAP.

Optionally, the GAP parameter includes: at least one of a mode of the GAP, a measurement period of the GAP, the number of measurements within a specific period of the GAP, and a start position of the GAP.

1004. The offload base station receives the service of the UE sent by the first base station.

Optionally, when the offload base station receives the service sent by the first base station, the offload base station is forbidden to send the service to the UE when the GAP starts. Therefore, the offload base station sends the service to the UE within a time when the UE monitors a cell on a network side, so that the service sent by the offload base station can be received by the UE.

1005. The offload base station sends the service to the UE.

In the foregoing technical solution, on the basis of the foregoing embodiment, a step of receiving, by the offload base station, a measurement notification message sent by the first base station is added. In this way, the offload base station sends a service to the UE only within a time when the UE monitors a cell of a network side, so that the service sent by the offload base station can be received by the UE, and in addition, utilization of network resources is improved.

Figure 11:
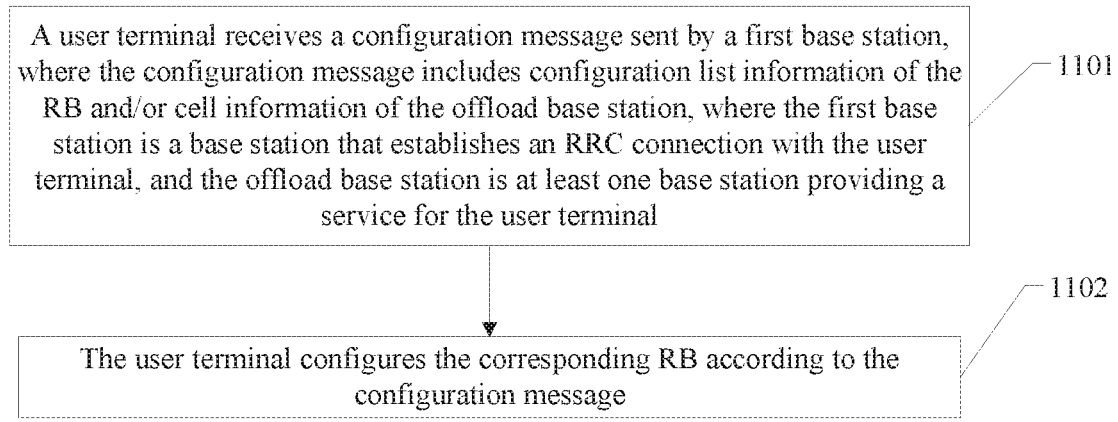

FIG. 11 is a schematic flowchart of another service transmission method according to an embodiment of the present invention. As shown in FIG. 11, the method includes the following:

1101. A UE receives a configuration message sent by a first base station, where the configuration message includes configuration list information of the RB and/or cell information of the offload base station, where the first base station is a base station that establishes an RRC connection with the UE, and the offload base station is at least one base station serving the UE.

Optionally, a configuration list of the RB includes:
the configuration list of the RB includes configuration information of at least one RB, where the configuration information of the RB includes at least one of the following items:
configuration information of a PDCP entity, configuration information of an RLC entity list, and MAC configuration information, a logical channel configuration message, and physical layer configuration information corresponding to each RLC entity in the RLC entity list; an identifier of a service; offload indication information; the offload rule; and configuration information of radio resources.

The offload indication information includes RB-based data offload information or packet-based data offload information.

The offload rule indicates a transmission base station for each data packet of the service of the UE, where the transmission base station is the first base station or the offload base station.

Optionally, the configuration information of the radio resources includes: at least one of a physical cell identifier, a logical cell identifier, a virtual cell identifier, frequency information, carrier information, radio resource block information, subcarrier information, subframe information, time-domain information, and space-domain information.

1102. The UE configures the corresponding RB according to the configuration message.

Optionally, after receiving the configuration message, the UE may configure the corresponding RB. When the configuration message includes the configuration information of the at least one RB, the configuration information includes the configuration information of the PDCP entity, the configuration information of the RLC entity list, and the MAC configuration information, logical channel configuration message, and physical layer configuration information corresponding to each RLC entity in the RLC entity list. In this way, the UE may configure a PDCP layer, an RLC layer, a MAC layer, and a physical layer, where the PDCP layer includes at least one PDCP entity, the RLC layer includes at least one RLC entity, the MAC layer includes at least one MAC entity, and the physical layer includes at least one physical layer entity.

Specifically, one PDCP entity, at least two RLC entities, and at least two MAC entities and at least two physical layer entities corresponding to the at least two RLC entities may be configured. For example, the PDCP entity corresponds to the first base station or the offload base station, the two RLC entities correspond to the first base station and at least one offload base station respectively, or the two RLC instances correspond to at least two offload base stations respectively.

In this way, the UE may receive, at the at least two RLC entities, the service sent by the at least two base stations.

In the foregoing technical solution, a UE receives a configuration message sent by a first base station, where the configuration message includes configuration list information of an RB and/or cell information of an offload base station; the UE configures the RB corresponding to the configuration message. In this way, the UE may receive a service sent over an RB established by the offload base station, and resources of the offload base station are utilized properly, so that utilization of network resources is improved.

Figure 12:
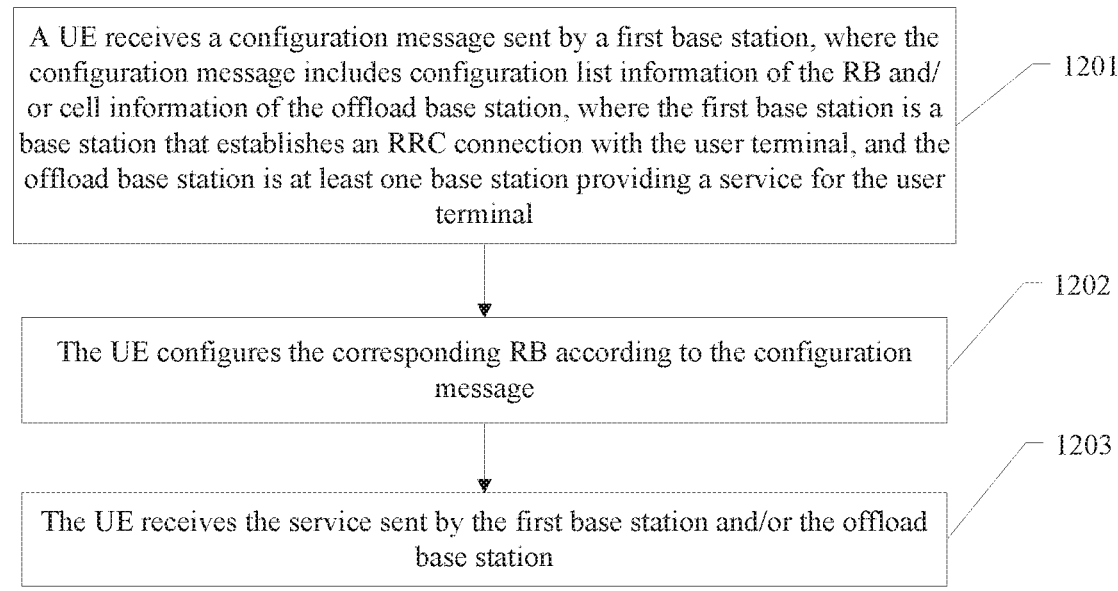

FIG. 12 is a schematic flowchart of another service transmission method according to an embodiment of the present invention. As shown in FIG. 12, the method includes following steps.

1201. A UE receives a configuration message sent by a first base station, where the configuration message includes configuration list information of the RB and/or cell information of the offload base station, where the first base station is a base station that establishes an RRC connection with the UE, and the offload base station is at least one base station serving the UE.

1202. The UE configures the corresponding RB according to the configuration message.

1203. The UE receives the service sent by the first base station and/or the offload base station.

Optionally, step 1203 may specifically be that the UE receives, by using the configured RB, the service sent by the first base station and/or the offload base station.

Specifically, the UE may receive, at a PDCP layer of the RB, the service sent by the first base station or the offload base station, or receive, at a PDCP layer of the RB, the service sent by the first base station or the offload base station, and receive, at an RLC entity of an RLC layer, the service sent by the first base station or the offload base station.

In an optional implementation manner, after step 1203, the method may further include the following: The UE decodes, according to an obtained allocation policy, the service by using an RV number of a cell corresponding to the service; or the UE decodes, according to an obtained allocation policy, the service by using an RV number of each time-domain and/or code-domain and/or frequency-domain and/or space-domain resource corresponding to the service.

The allocation policy indicates an RV number used by a cell that participates in offload and belongs to the offload base station and an RV number used by a cell that participates in offload and belongs to the first base station; or the allocation policy indicates an RV number used by each time-domain and/or code-domain and/or frequency-domain and/or space-domain resource used for sending the service by a cell that participates in offload and belongs to the offload base station and an RV number used by each time-domain and/or code-domain and/or frequency-domain and/or space-domain resource used for sending the service by a cell that participates in offload and belongs to the first base station.

Optionally, assuming that base stations sending the service of the UE include the first base station and an offload base station 1, while cells that belong to the first base station include a cell 1 and a cell 2, and cells that belong to the offload base station 1 include a cell 3 and a cell 4, the allocation policy may indicate that: the RV number used by the cell 1 is 0, the RV number used by the cell 2 is 2, the RV number used by the cell 3 is 3, and the RV number used by the cell 4 is 1. When the UE receives the service in the cell 1, the UE decodes the received service by using 0.

It should be noted that in this implementation manner, step 1203 may specifically include the following: The UE receives the same service sent by at least two base stations, where the at least two base stations are two base stations in the first base station and the offload base stations.

Specifically, the UE may receive, at the PDCP layer, the service sent by the first base station, and receive, at an RLC entity of the RLC layer, the service sent by the offload base station.

In this implementation manner, the UE may receive services sent by multiple base stations, and the services sent by the multiple base stations are the same. In comparison with the prior art in which a base station sends a service to the UE for multiple times, in this implementation manner, resources of the multiple base stations may be utilized properly.

In the foregoing technical solution, the UE may receive the service sent by the offload base station. In this way, resources of the offload base station are utilized properly, and utilization of network resources is improved.

Figure 13:
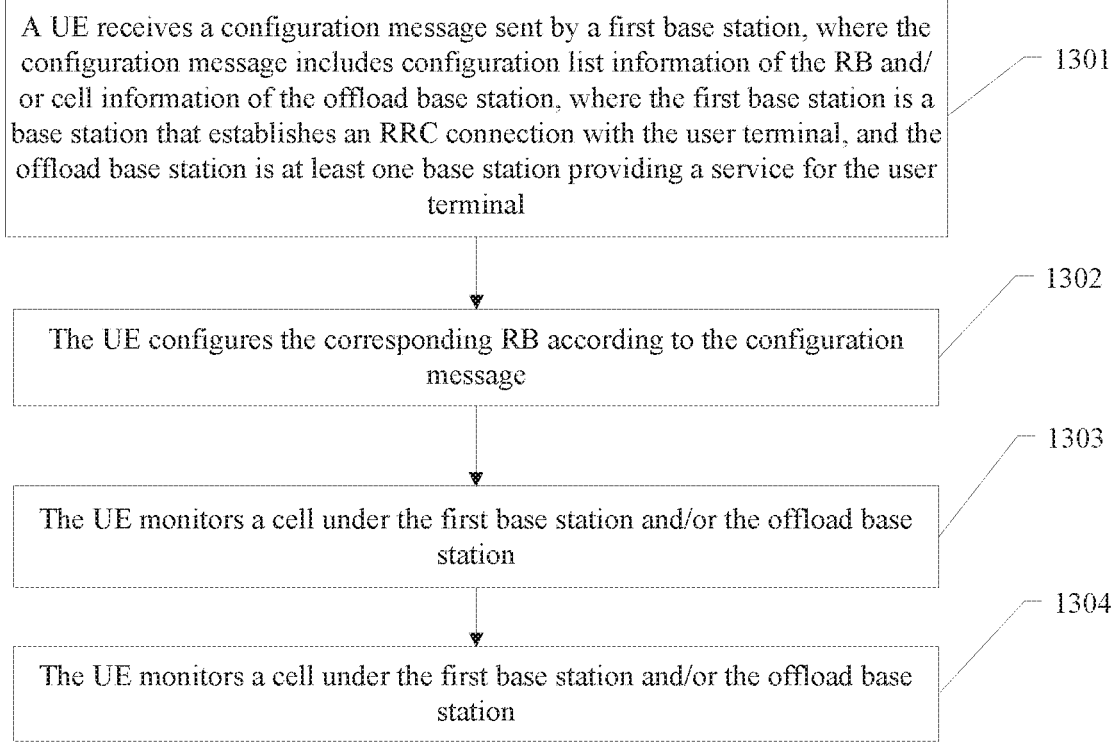

FIG. 13 is a schematic flowchart of another service transmission method according to an embodiment of the present invention. As shown in FIG. 13, the method includes following steps.

1301. A UE receives a configuration message sent by a first base station, where the configuration message includes configuration list information of the RB and/or cell information of the offload base station, where the first base station is a base station that establishes an RRC connection with the UE, and the offload base station is at least one base station serving the UE.

1302. The UE configures the corresponding RB according to the configuration message.

1303. The UE monitors a cell that belongs to the first base station and/or the offload base station.

Specifically, before step 1303, the UE receives at least one DRX parameter sent by the first base station, where the at least one DRX parameter corresponds to radio frequencies of the UE on a one-to-one basis. In this way, the UE enters an on-duration and a sleep time according to the DRX parameter to save power consumption. Step 1303 may specifically be monitoring a cell that belongs to the first base station and/or the offload base station within the on-duration. And the first base station and the offload base station also send the service to the UE within the on-duration. In this way, the UE may save power consumption.

In an optional implementation manner, step 1303 may specifically include the following:

the UE receives a cross-cell or cross-carrier scheduling indication and the cell information of the offload base station, which are sent by the first base station; and the UE monitors a cell that belongs to the offload base station.

Specifically, the UE receives, within a previous on-duration before the offload base station sends the service to the UE, the cross-cell or cross-carrier scheduling indication and the cell information of the offload base station, which are sent by the first base station. After the UE receives the cross-cell or cross-carrier scheduling indication and the cell information of the offload base station, the UE monitors the cell that belongs to the offload base station within a next on-duration.

In an optional implementation manner, step 1303 may further include the following:

the UE monitors a cell that belongs to the first base station; and the UE receives a cross-cell or cross-carrier scheduling indication and the cell information of the offload base station, which are sent by the first base station; and the UE monitors a cell that belongs to the offload base station.

In an optional implementation manner, step 1303 may specifically include the following: The UE receives MAC control signaling sent by the first base station; and the UE monitors a cell that belongs to at least one base station in the offload base stations.

In an optional implementation manner, step 1303 may specifically include the following:

the UE monitors a cell that belongs to the first base station; and when the UE receives the service sent by the first base station, the first base station monitors a cell that belongs to the offload base station.

Specifically, the UE may preferentially monitor the cell that belongs to the first base station within the on-duration. When a data packet sent by the first base station is received within the on-duration, the first base station monitors the cell that belongs to the offload base station.

In this implementation manner, a service of the UE may be sent by the first base station and the offload base station. In this way, resources of the offload base station are utilized properly.

It should be noted that step 1303 may be executed simultaneously with step 1304, for example, when the service sent by the first base station is received in step 1304, a cell that belongs to at least one base station in the offload base stations is monitored.

1304. The UE receives the service sent by the first base station and/or the offload base station.

In an optional implementation manner, after step 1404, the method may further include the following:

The UE depacketizes, at the at least one RLC entity, the service received by at least one RLC entity, and transmits the service depacketized by the at least one RLC entity to a PDCP layer.

The UE uploads the service received by the PDCP layer to a higher layer.

Optionally, before the step in which the UE uploads the service received by the PDCP layer to a higher layer, the UE receives an offload rule sent by the first base station, where the offload rule indicates a transmission base station for each data packet of the service of the UE, where the transmission base station is the first base station or the offload base station. In this way, data received by the PDCP layer may be sorted according to the offload rule, and the sorted data is sent to the higher layer. This may save power consumption of the UE.

In the foregoing technical solution, on the basis of the foregoing embodiment, a step of monitoring, by the UE, a cell that belongs to the first base station and/or the offload base station, is added. Therefore, the UE may accurately receive the service sent by the first base station and/or offload base station. In addition, resources of the offload base station are utilized properly, and utilization of network resources is improved.

Figure 14:
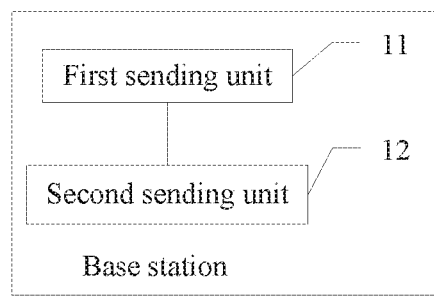

FIG. 14 is a schematic structural diagram of a base station according to an embodiment of the present invention. The base station is a base station that establishes an RRC connection with the UE. As shown in FIG. 14, the base station includes a first sending unit 11 and a second sending unit 12.

The first sending unit 11 is configured to send a request message to an offload base station, where the request message includes at least one piece of service information, where the service information includes QoS information of a service and/or configuration information of an RB, the offload base station is at least one base station in base stations serving the UE, and the request message instructs the offload base station to perform resource configuration according to the at least one piece of service information.

Optionally, the configuration information of the RB includes: configuration information of a PDCP layer, an RLC layer, a MAC layer, and a physical layer, or configuration information of an RLC layer, a MAC layer, and a physical layer.

In this way, the offload base station may configure the PDCP layer, RLC layer, MAC layer, and physical layer, or RLC layer, MAC layer, and physical layer of the RB corresponding to the at least one piece of service information.

Optionally, the service information may further include: at least one of configuration coordination information of radio resources of the RB, an identifier of the RB, an identifier of an RAB, and offload indication information.

Optionally, the configuration coordination information of the radio resources of the RB includes at least one of a physical cell identifier, a logical cell identifier, a virtual cell identifier, frequency information, carrier information, radio resource block information, subcarrier information, subframe information, time-domain information, and space-domain information.

The offload indication information includes RB-based data offload information or packet-based data offload information. The meanings of the RB-based data offload information and packet-based data offload information refers to the above embodiments.

Optionally, when the offload indication information includes the packet-based data offload information, the offload base station configures, according to the at least one piece of service information, the RLC layer, MAC layer, and physical layer of the RB corresponding to the at least one service, and then the first base station configures the PDCP layer, RLC layer, MAC layer, and physical layer of the RB.

In an optional implementation manner, the request message may further include: an identifier of the UE.

The second sending unit 12 is configured to send a configuration message to the UE, where the configuration message includes configuration list information of the RB and/or cell information of the offload base station, so that the UE configures the corresponding RB according to the configuration message.

Optionally, after receiving the configuration message, the UE may configure the corresponding RB. Details refer to above embodiments.

In an optional implementation manner, the configuration list information of the RB includes:

the configuration list of the RB includes configuration information of at least one RB, where the configuration information of the RB includes at least one of the following items:

configuration information of a PDCP entity, configuration information of an RLC entity list, and MAC configuration information, a logical channel configuration message, and physical layer configuration information corresponding to each RLC entity in the RLC entity list; an identifier of the service; the offload indication information; the offload rule; and configuration information of radio resources.

Optionally, the configuration information of the radio resources may include: at least one of a physical cell identifier, a logical cell identifier, a virtual cell identifier, frequency information, carrier information, radio resource block information, subcarrier information, time-domain information, and space-domain information.

In an optional implementation manner, the first sending unit 11 may further be configured to send the service of the UE to the offload base station.

In this way, the service of the UE may be sent by multiple base stations.

In the foregoing technical solution, the service of the UE may be sent to the UE through the first base station and/or offload base station. In comparison with the prior art in which the service is sent to the UE uniformly by one base station, in the present invention, resources of the first base station and offload base station may be utilized properly, and utilization of network resources is improved.

Figure 15:
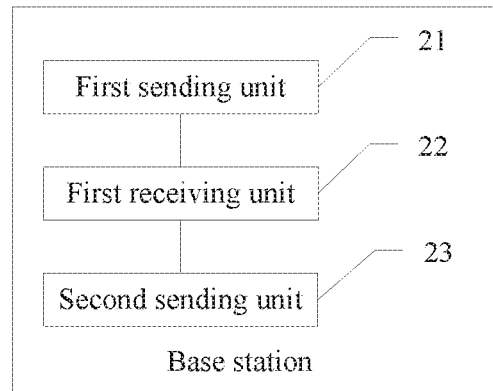

FIG. 15 is a schematic structural diagram of another base station according to an embodiment of the present invention. As shown in FIG. 15, the base station includes a first sending unit 21, a first receiving unit 22, and a second sending unit 23.

The first sending unit 21 is configured to send a request message to an offload base station, where the request message includes at least one piece of service information, where the service information includes QoS information of a service and/or configuration information of an RB, the offload base station is at least one base station in base stations serving the UE, and the request message instructs the offload base station to perform resource configuration according to the at least one piece of service information.

The first receiving unit 22 is configured to receive a response message returned by the offload base station, where the response message includes an identifier of the UE, and a status message and/or an indication message; where the status message includes a status message for rejecting the request message, or a status message for receiving the request message, or a status message for modifying the request message; and the indication message includes an identifier and/or configuration information of an RB whose resource configuration is accepted by the offload base station and/or an identifier of a corresponding RAB, and/or an identifier and/or configuration information of an RB whose resource configuration is rejected by the offload base station and/or an identifier of a corresponding RAB.

Optionally, after the offload base station receives the request message, the offload base station may return a response message to the first base station according to a resource status and/or load condition of the offload base station, where the response message includes the identifier of the UE, and the status message and/or the indication message. By using the first receiving unit 22, network resources may be maximized.

The second sending unit 23 is configured to send a configuration message to the UE, where the configuration message includes configuration list information of the RB and/or cell information of the offload base station, so that the UE configures the corresponding RB according to the configuration message.

An offload rule defining unit 26 is configured to define an offload rule for data packets of the service of the UE, where the offload rule indicates a transmission base station for each data packet of the service of the UE, where the transmission base station is the first base station or the offload base station.

Optionally, the second sending unit 23 may further be configured to send the offload rule defined by the offload rule defining unit 26 to the UE; when the UE separately receives data packets sent by the first base station and the offload base station, and receives, at a PDCP entity, data packets uploaded by different RLC entities, the UE may sort uploaded data according to the offload rule, with no need to depacketize the uploaded data to obtain a sequence number of each data packet. In this way, power consumption of the UE may be saved.

In an optional implementation manner, the first sending unit 21 may further be configured to send a cross-cell or cross-carrier scheduling indication and the cell information of the offload base station to the UE within a previous on-duration of the UE before the offload base station sends the service to the UE, so that the UE monitors a cell that belongs to the offload base station.

In the foregoing technical solution, on the basis of the foregoing embodiment, a first receiving unit is added and configured to receive a response message returned by the offload base station; therefore, network resources may be maximized.

Figure 16:
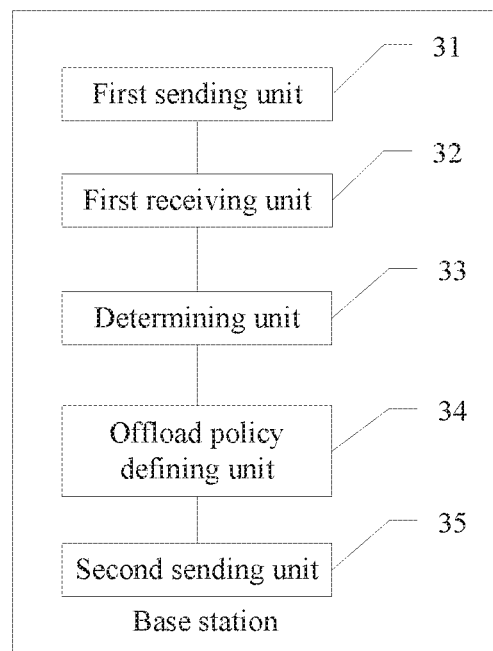

FIG. 16 is a schematic structural diagram of another base station according to an embodiment of the present invention. As shown in FIG. 16, the base station includes a first sending unit 31, a first receiving unit 32, a determining unit 33, an offload policy defining unit 34, and a second sending unit 35.

The first sending unit 31 is configured to send a request message to an offload base station, where the request message includes at least one piece of service information, where the service information includes QoS information of a service and/or configuration information of an RB, the offload base station is at least one base station in base stations serving the UE, and the request message instructs the offload base station to perform resource configuration according to the at least one piece of service information.

The first receiving unit 32 is configured to receive a resource status report message and/or channel resource information of the offload base station sent by the offload base station, and/or, receive channel resource information of the offload base station sent by the UE.

The resource status report message includes the number of data packets that can be sent and/or the number of data packets waiting to be sent in a buffer, and the channel resource includes at least one of a channel quality indicator CQI, a PMI, and an RI.

The determining unit 33 is configured to determine a transmission capability of the offload base station according to the resource status report message and/or channel resource information received by the first receiving unit 32.

The offload policy defining unit 34 is configured to define an offload policy for the data packets of the service of the UE according to the capability of the offload base station, where the offload policy indicates the number of data packets sent by the offload base station to the UE within a specific time.

Before the first base station defines the offload policy for the data packets of the service of the UE according to the capability of the offload base station, if the method includes defining, by the first base station, an offload rule, the offload policy replaces the offload rule.

The second sending unit 35 is configured to send a configuration message to the UE, where the configuration message includes configuration list information of the RB and/or cell information of the offload base station, so that the UE configures the corresponding RB according to the configuration message.

Optionally, the second sending unit 35 is configured to send the offload policy to the UE.

Optionally, when the UE receives the offload policy, if the UE receives an offload rule (refer to the first embodiment) before receiving the offload policy, the UE replaces the offload rule with the offload policy.

The first sending unit 31 may further be configured to send data packets corresponding to the number of data packets of the service of the UE to the offload base station.

The second sending unit 35 may further be configured to send data packets beyond the data packets corresponding to the number of data packets of the service of the UE to the UE.

In the foregoing technical solution, the number of data packets sent by the offload base station to the UE within a specific time may be determined dynamically according to resource information of the offload base station. Therefore, network resources may be utilized properly, and utilization of the network resources is improved.

Figure 17:
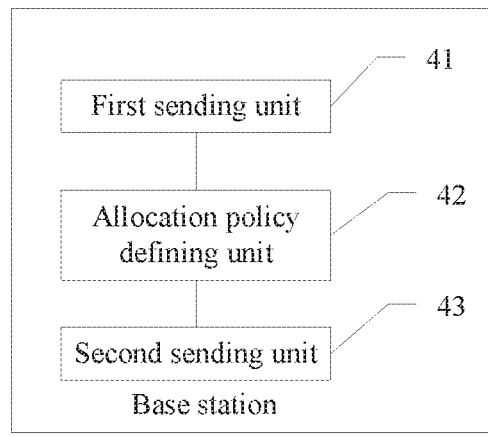

FIG. 17 is a schematic structural diagram of another base station according to an embodiment of the present invention. As shown in FIG. 17, the base station includes a first sending unit 41, an allocation policy defining unit 42, and a second sending unit 43.

The first sending unit 41 is configured to send a request message to an offload base station, where the request message includes at least one piece of service information, where the service information includes QoS information of a service and/or configuration information of an RB, the offload base station is at least one base station in base stations serving the UE, and the request message instructs the offload base station to perform resource configuration according to the at least one piece of service information.

The allocation policy defining unit 42 is configured to define an allocation policy for redundancy version numbers, where the allocation policy indicates a redundancy version number used by a cell that participates in offload and belongs to the offload base station and a redundancy version number used by a cell that participates in offload and belongs to the first base station; or the allocation policy indicates a redundancy version number used by each time-domain and/or code-domain and/or frequency-domain and/or space-domain resource used for sending the service by a cell that participates in offload and belongs to the offload base station and a redundancy version number used by each time-domain and/or code-domain and/or frequency-domain and/or space-domain resource used for sending the service by a cell that participates in offload and belongs to the first base station.

Optionally, the first sending unit 41 may further be configured to send the allocation policy to the UE, so that when the UE receives the service in a cell that belongs to the offload base station, the UE decodes the received service by using the redundancy version number corresponding to the cell or decodes the received service by using the redundancy version number corresponding to each time-domain and/or code-domain and/or frequency-domain and/or space-domain resource used for receiving the service in the cell.

The second sending unit 43 is configured to send a configuration message to the UE, where the configuration message includes configuration list information of the RB and/or cell information of the offload base station, so that the UE configures the corresponding RB according to the configuration message.

Optionally, the first sending unit 41 may further be configured to send the service of the UE to at least two offload base stations; or optionally, the first sending unit 41 may further be configured to send the service of the UE to at least one offload base station.

The second sending unit 43 is configured to send the service of the UE to the UE.

When the UE receives the service in a cell that belongs to the offload base station or first base station, the UE decodes received data by using the RV number corresponding to the cell.

In the foregoing technical solution, at least two base stations may send services to the UE, and the services sent by the base stations are the same. In comparison with the prior art in which a base station sends a service to the UE for multiple times, in the embodiment of the present invention, resources of each offload base station may be better utilized.

Figure 18:
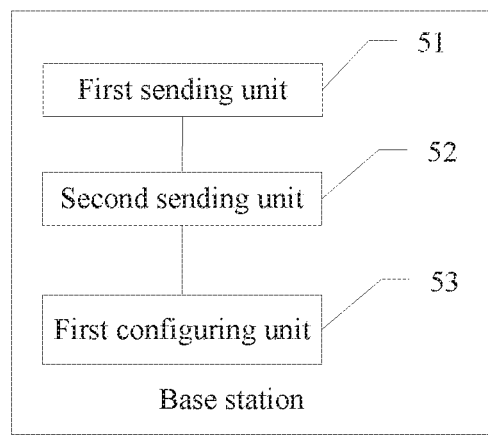

FIG. 18 is a schematic structural diagram of another base station according to an embodiment of the present invention. The base station is a base station that establishes an RRC connection with the UE. As shown in FIG. 18, the base station includes a first sending unit 51, a second sending unit 52, and a first configuring unit 53.

The first sending unit 51 is configured to send a request message to an offload base station, where the request message includes at least one piece of service information, where the service information includes QoS information of a service and/or configuration information of an RB, the offload base station is at least one base station in base stations serving the UE, and the request message instructs the offload base station to perform resource configuration according to the at least one piece of service information.

The second sending unit 52 is configured to send a configuration message to the UE, where the configuration message includes configuration list information of the RB and/or cell information of the offload base station, so that the UE configures the corresponding RB according to the configuration message.

The first configuring unit 53 is configured to configure a measurement gap GAP parameter of the UE.

Optionally, the first sending unit 51 may further be configured to send a measurement notification message to the offload base station, where the measurement notification message includes an identifier of the UE, the GAP parameter, and start time information of the GAP, and the measurement notification message is used to notify the offload base station of measurement configuration information of at least one UE whose service is offloaded by the base station.

When the offload base station receives the service sent by the first base station, the offload base station is forbidden to send the service to the UE when the GAP starts. Therefore, the offload base station sends the service to the UE within a time when the UE monitors a cell on a network side, so that the service sent by the offload base station can be received by the UE.

Optionally, the second sending unit 52 may further be configured to send the GAP parameter to the UE.

Optionally, the GAP parameter includes: at least one of a mode of the GAP, a measurement period of the GAP, the number of measurements within a specific period of the GAP, and a start position of the GAP.

In the foregoing technical solution, on the basis of the foregoing embodiment, steps of configuring a GAP parameter by the configuring unit and sending the GAP parameter to the offload base station and the UE are added; the offload base station sends a service to the UE only within a time when the UE monitors a cell of a network side, so that the service sent by the offload base station can be received by the UE, and in addition, utilization of network resources is improved.

Figure 19:
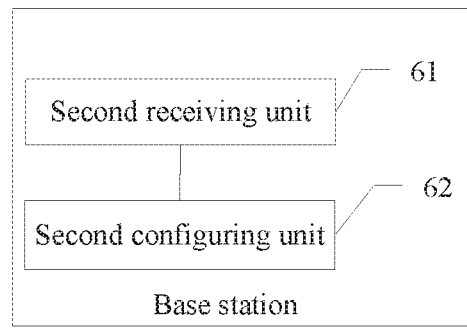

FIG. 19 is a schematic structural diagram of another base station according to an embodiment of the present invention. The base station is a base station serving the UE. As shown in FIG. 19, the base station includes a second receiving unit 61 and a second configuring unit 62.

The second receiving unit 61 is configured to receive a request message sent by a first base station, where the request message includes at least one piece of service information, where the service information includes QoS information of the service and/or configuration information of an RB, and the first base station is a base station that establishes an RRC connection with the UE.

Optionally, the configuration information of the RB includes: configuration information of a PDCP layer, an RLC layer, a MAC layer, and a physical layer, or configuration information of an RLC layer, a MAC layer, and a physical layer.

Optionally, the service information may further include: at least one of configuration coordination information of radio resources of the RB, an identifier of the RB, an identifier of a radio access bearer (RAB), and offload indication information.

Optionally, the configuration coordination information of the radio resources of the RB includes at least one of a physical cell identifier, a logical cell identifier, a virtual cell identifier, frequency information, carrier information, radio resource block information, subcarrier information, subframe information, time-domain information, and space-domain information.

The offload indication information includes RB-based data offload information or packet-based data offload information. The meanings of RB-based data offload information and packet-based data offload information refers to the above embodiments.

Optionally, when the offload indication information includes the packet-based data offload information, the offload base station configures, according to the at least one piece of service information, the RLC layer, MAC layer, and physical layer of the RB corresponding to the at least one service, and then the first base station configures the PDCP layer, RLC layer, MAC layer, and physical layer of the RB.

In an optional implementation manner, the request message may further include: an identifier of the UE.

The second configuring unit 62 is configured to configure a resource configuration corresponding to the at least one piece of service information.

Optionally, the second configuring unit 62 may specifically configure the PDCP layer, RLC layer, MAC layer, and physical layer, or RLC layer, MAC layer, and physical layer of the RB corresponding to the at least one piece of service information.

In the foregoing technical solution, an offload base station receives a request message sent by a first base station, and configures a resource configuration corresponding to at least one piece of service information. In this way, resources of the offload base station are utilized properly, and utilization of network resources is improved.

Figure 20:
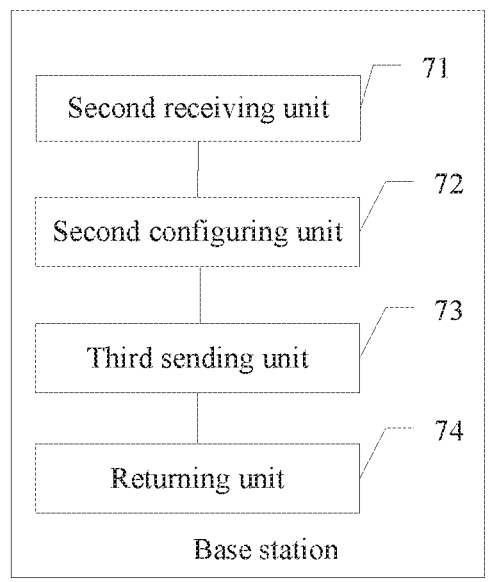

FIG. 20 is a schematic structural diagram of another base station according to an embodiment of the present invention. The base station is a base station serving the UE. As shown in FIG. 20, the base station includes a second receiving unit 71, a second configuring unit 72, and a third sending unit 73.

The second receiving unit 71 is configured to receive a request message sent by a first base station, where the request message includes at least one piece of service information, where the service information includes QoS information of the service and/or configuration information of an RB, and the first base station is a base station that establishes an RRC connection with the UE.

The second configuring unit 72 is configured to configure a resource configuration corresponding to the at least one piece of service information.

Optionally, the second configuring unit 72 may specifically configure a PDCP layer, an RLC layer, a MAC layer, and a physical layer, or an RLC layer, a MAC layer, and a physical layer of the RB corresponding to the at least one piece of service information.

Optionally, the second receiving unit 71 may further be configured to receive the service of the UE sent by the first base station.

The third sending unit 73 is configured to send the service received by the second receiving unit 71 to the UE.

In an optional implementation manner, the base station may further include:

a returning unit 74, configured to send a response message to the first base station, where the response message includes an identifier of the UE, and a status message and/or an indication message; where the status message includes a status message for rejecting the request message, or a status message for receiving the request message, or a status message for modifying the request message; and the indication message includes an identifier and/or configuration information of an RB whose resource configuration is accepted by the offload base station and/or an identifier of a corresponding RAB, and/or an identifier and/or configuration information of an RB whose resource configuration is rejected by the offload base station and/or an identifier of a corresponding RAB.

Optionally, the returning unit 74 may return a response message to the first base station according to a resource status and/or load condition of the offload base station, where the response message includes the identifier of the UE, and the status message and/or the indication message. By using the returning unit 74, network resources may be maximized.

In an optional implementation manner, the second receiving unit 71 is further configured to receive a GAP parameter, the identifier of the UE, and start time information of the GAP, which are sent by the first base station, where the start time information of the GAP indicates that the offload base station is forbidden to send the service to the UE within the start time of the GAP.

In this implementation manner, the second receiving unit 71 receives the GAP parameter sent by the first base station. In this way, the base station sends the service to the UE only within a time when the UE monitors a cell on a network side, so that the service sent by the base station can be received by the UE, and in addition, utilization of network resources is improved.

In the foregoing technical solution, on the basis of the foregoing embodiment, the following steps are added: The offload base station receives a service sent by the first base station, and sends the service to the UE; and the offload base station receives, at a higher layer (for example, a PDCP layer or an RLC layer), the service sent by the first base station. In comparison with the prior art in which the service sent by the first base station is received at the physical layer, this solution reduces a delay and improves service transmission efficiency. In addition, resources of the offload base station may be utilized properly, and utilization of network resources is improved.

Figure 21:
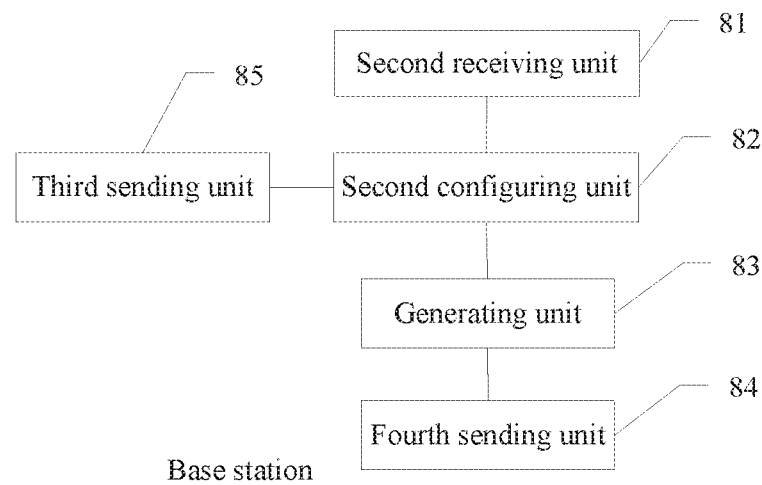

FIG. 21 is a schematic structural diagram of another base station according to an embodiment of the present invention. The base station is a base station serving the UE. As shown in FIG. 21, the base station includes a second receiving unit 81, a second configuring unit 82, a generating unit 83, a fourth sending unit 84, and a third sending unit 85.

The second receiving unit 81 is configured to receive a request message sent by a first base station, where the request message includes at least one piece of service information, where the service information includes QoS information of the service and/or configuration information of an RB, and the first base station is a base station that establishes an RRC connection with the UE.

The second configuring unit 82 is configured to configure a resource configuration corresponding to the at least one piece of service information.

Optionally, the second configuring unit 82 may specifically configure a PDCP layer, an RLC layer, a MAC layer, and a physical layer, or an RLC layer, a MAC layer, and a physical layer of the RB corresponding to the at least one piece of service information.

The generating unit 83 is configured to generate a resource status report message according to the offload base station; and/or, for the offload base station to receive channel resource information sent by the UE relative to the offload base station, where the resource status report message includes the number of data packets that can be sent and/or the number of data packets waiting to be sent in a buffer, and the channel resource includes at least one of a CQI, a PMI, and an RI.

The fourth sending unit 84 is configured to send the resource status report message and/or the channel resource information to the first base station, so that the first base station calculates a transmission capability of the offload base station and defines an offload policy according to the transmission capability, where the offload policy indicates the number of data packets of the service sent by the offload base station to the UE within a specific time.

Optionally, the second receiving unit 81 may further be configured to receive data packets corresponding to the number of data packets of the service sent by the first base station.

The third sending unit 85 is configured to send the service received by the second receiving unit 81 to the UE.

In an optional implementation manner, the fourth sending unit 84 is further configured to send indication information to the first base station, where the indication information instructs the first base station to send a cross-cell or cross-carrier scheduling indication and an identifier of the offload base station to the UE within a previous on-duration of the UE before the offload base station sends the service to the UE, so that the UE monitors a cell that belongs to the offload base station.

In the foregoing technical solution, a first base station defines an offload policy according to a capability of the base station, and the base station receives a data packet sent by the first base station according to the offload policy. In this way, resources of the base station may be utilized properly, and utilization of network resources is improved.

Figure 22:
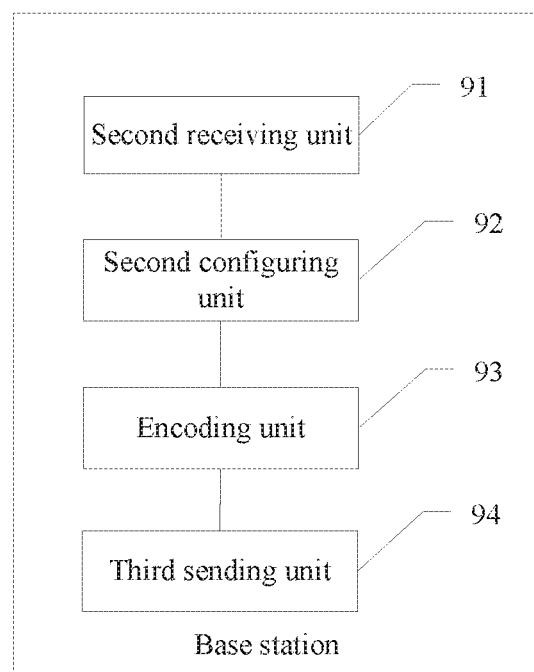

FIG. 22 is a schematic structural diagram of another base station according to an embodiment of the present invention. The base station is a base station serving the UE. As shown in FIG. 22, the base station includes a second receiving unit 91, a second configuring unit 92, an encoding unit 93, and a third sending unit 94.

The second receiving unit 91 is configured to receive a request message sent by a first base station, where the request message includes at least one piece of service information, where the service information includes QoS information of the service and/or configuration information of an RB, and the first base station is a base station that establishes an RRC connection with the UE.

The second configuring unit 92 is configured to configure a resource configuration corresponding to the at least one piece of service information.

The second receiving unit 91 may further be configured to receive the service sent by the first base station.

The encoding unit 93 is configured to encode, according to a pre-obtained allocation policy for redundancy version numbers, the service by using a redundancy version number corresponding to each cell that belongs to the offload base station; or for the offload base station to encode, according to a pre-obtained allocation policy for redundancy version numbers, the service by using a redundancy version number corresponding to each subframe of each cell that belongs to the offload base station.

The allocation policy indicates the redundancy version number used by each cell that belongs to the offload base station; or the allocation policy indicates the redundancy version number used by each subframe of each cell that belongs to the offload base station.

The third sending unit 94 is configured to send the service to the UE.

Optionally, the service sent by the third sending unit 94 may be specifically the same as the service sent by another offload base station and the first base station.

In this way, multiple base stations may send the same service to the UE, and resources of each base station serving the UE are utilized properly, so that utilization of network resources is improved.

In the foregoing technical solution, on the basis of the foregoing embodiment, the following steps are added: An allocation policy for RV numbers is defined; and when the offload base station and the first base station send a service to the UE, encoding is performed according to the allocation policy. In this way, multiple base stations may send the same service to the UE, and resources of each base station serving the UE are utilized properly, so that utilization of network resources is improved.

Figure 23:
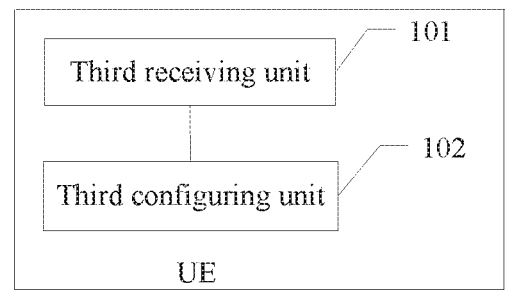

FIG. 23 is a schematic structural diagram of a UE according to an embodiment of the present invention. As shown in FIG. 23, the UE includes a third receiving unit 101 and a third configuring unit 102.

The third receiving unit 101 is configured to receive a configuration message sent by a first base station, where the configuration message includes configuration list information of the RB and/or cell information of the offload base station, where the first base station is a base station that establishes an RRC connection with the UE, and the offload base station is at least one base station serving the UE.

Optionally, a configuration list of the RB includes:

the configuration list of the RB includes configuration information of at least one RB, where the configuration information of the RB includes at least one of the following items:

configuration information of a PDCP entity, configuration information of an RLC entity list, and MAC configuration information, a logical channel configuration message, and physical layer configuration information corresponding to each RLC entity in the RLC entity list; an identifier of a service; offload indication information; the offload rule; and configuration information of radio resources.

The offload indication information includes RB-based data offload information or packet-based data offload information.

The offload rule indicates a transmission base station for each data packet of the service of the UE, where the transmission base station is the first base station or the offload base station.

Optionally, the configuration information of the radio resources includes: at least one of a physical cell identifier, a logical cell identifier, a virtual cell identifier, frequency information, carrier information, radio resource block information, subcarrier information, time-domain information, and space-domain information.

The third configuring unit 102 is configured to configure the corresponding RB according to the configuration message.

Optionally, after receiving the configuration message, the UE may configure the corresponding RB. When the configuration message includes the configuration information of the at least one RB, the configuration information includes the configuration information of the PDCP entity, the configuration information of the RLC entity list, and the MAC configuration information, logical channel configuration message, and physical layer configuration information corresponding to each RLC entity in the RLC entity list. In this way, the UE may configure the PDCP layer, RLC layer, MAC layer, and physical layer, where the PDCP layer includes at least one PDCP entity, the RLC layer includes at least one RLC entity, the MAC layer includes at least one MAC entity, and the physical layer includes at least one physical layer entity.

Specifically, one PDCP entity, at least two RLC entities, and at least two MAC entities and at least two physical layer entities corresponding to the at least two RLC entities may be configured. For example, the PDCP entity corresponds to the first base station or the offload base station, the two RLC instances correspond to the first base station and at least one offload base station respectively, or the two RLC instances correspond to at least two offload base stations respectively.

In this way, the UE may receive, at the at least two RLC entities, the service sent by the at least two base stations.

In an optional implementation manner, the third receiving unit 101 may further be configured to receive the service sent by the first base station and/or the offload base station.

Optionally, the third receiving unit 101 may specifically receive, by using the configured RB, the service sent by the first base station and/or the offload base station.

Specifically, the third receiving unit may receive, at the PDCP layer of the RB, the service sent by the first base station or the offload base station, or receive, at the PDCP layer of the RB, the service sent by the first base station or the offload base station, and receive, at an RLC entity of the RLC layer, the service sent by the first base station or the offload base station.

In the foregoing technical solution, a UE receives a configuration message sent by a first base station, where the configuration message includes configuration list information of an RB and/or cell information of an offload base station; the UE configures the RB corresponding to the configuration message. In this way, the UE may receive a service sent over an RB established by the offload base station, and resources of the offload base station are utilized properly, so that utilization of network resources is improved.

Figure 24:
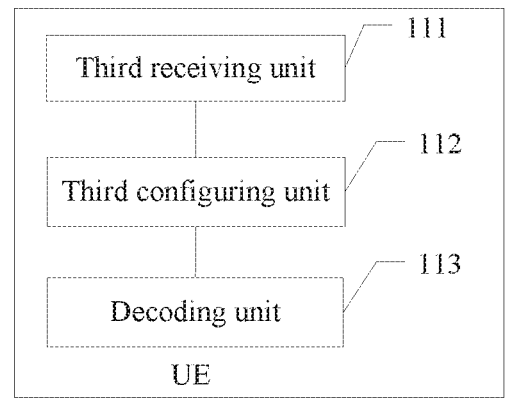

FIG. 24 is a schematic structural diagram of another UE according to an embodiment of the present invention. As shown in FIG. 24, the UE includes a third receiving unit 111, a third configuring unit 112, and a decoding unit 113.

The third receiving unit 111 is configured to receive a configuration message sent by a first base station, where the configuration message includes configuration list information of the RB and/or cell information of the offload base station, where the first base station is a base station that establishes an RRC connection with the UE, and the offload base station is at least one base station serving the UE.

The third configuring unit 112 is configured to configure the corresponding RB according to the configuration message.

The third receiving unit 111 is further configured to receive the service sent by the first base station and/or the offload base station.

In an optional implementation manner, the third receiving unit 111 is further configured to receive a cross-cell or cross-carrier scheduling indication and the cell information of the offload base station, which are sent by the first base station.

The decoding unit 113 is configured to decode, according to an obtained allocation policy, the service by using an RV number of a cell corresponding to the service; or to decode, according to an obtained allocation policy, the service by using an RV number of a time-domain and/or code-domain and/or frequency-domain and/or space-domain resource of a cell corresponding to the service.

The allocation policy indicates an RV number used by a cell that participates in offload and belongs to the offload base station and an RV number used by a cell that participates in offload and belongs to the first base station; or the allocation policy indicates an RV number used by each time-domain and/or code-domain and/or frequency-domain and/or space-domain resource used for sending the service by a cell that participates in offload and belongs to the offload base station and an RV number used by each time-domain and/or code-domain and/or frequency-domain and/or space-domain resource used for sending the service by a cell that participates in offload and belongs to the first base station.

Optionally, the third receiving unit 111 may further be configured to receive the same service sent by at least two base stations, where the at least two base stations are two base stations in the first base station and the offload base stations. Specifically, the third receiving unit may receive, at a PDCP layer, the service sent by the first base station, and receive, at an RLC entity of an RLC layer, the service sent by the offload base station.

In the foregoing technical solution, a UE may receive services sent by multiple base stations, and the services sent by the multiple base stations are the same. In comparison with the prior art in which a base station sends a service to the UE for multiple times, in this implementation manner, resources of the multiple base stations may be utilized properly.

Figure 25:
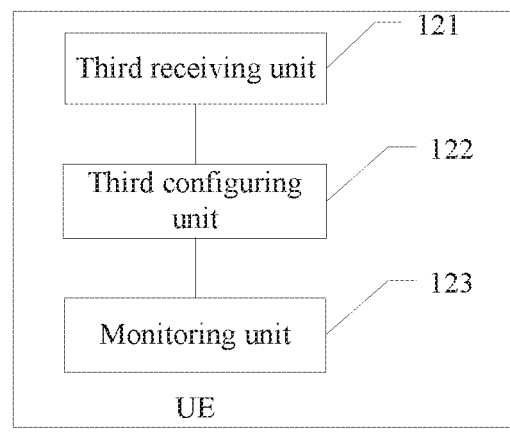

FIG. 25 is a schematic structural diagram of another UE according to an embodiment of the present invention. As shown in FIG. 25, the UE includes a third receiving unit 121, a third configuring unit 122, and a monitoring unit 123.

The third receiving unit 121 is configured to receive a configuration message sent by a first base station, where the configuration message includes configuration list information of the RB and/or cell information of the offload base station, where the first base station is a base station that establishes an RRC connection with the UE, and the offload base station is at least one base station serving the UE.

The third configuring unit 122 is configured to configure the corresponding RB according to the configuration message.

The monitoring unit 123 is configured to monitor a cell that belongs to the offload base station.

The UE may accurately receive the service sent by the first base station and/or offload base station. In addition, the UE may save power consumption.

Optionally, the monitoring unit 123 is further configured to monitor a cell that belongs to the first base station; when the UE receives a data packet sent by the first base station, the monitoring unit is further configured to monitor the cell that belongs to the offload base station. In this way, a service of the UE may be sent by the first base station and the offload base station. In this way, resources of the offload base station are utilized properly.

Optionally, the third receiving unit 121 may further be configured to receive MAC control signaling sent by the first base station.

The monitoring unit 123 may further be configured to monitor a cell that belongs to at least one base station in the offload base stations.

In this way, the UE may monitor the cell that belongs to the offload base station according to the MAC control signaling of the first base station. Thereby, when the UE does not receive the MAC control signaling, the UE does not monitor the cell that belongs to the offload base station, thereby achieving an effect of saving power consumption.

In an optional implementation manner, the UE may further include:

a depacketizing unit, configured to depacketize, at the at least one RLC entity, the service received by at least one RLC entity, and transmit the service depacketized by the at least one RLC entity to a PDCP layer; and an uploading unit, configured to upload the service received by the PDCP layer to a higher layer.

Optionally, before the uploading unit uploads the service received by the PDCP layer to the higher layer, the UE receives an offload rule sent by the first base station, where the offload rule indicates a transmission base station for each data packet of the service of the UE, where the transmission base station is the first base station or the offload base station. In this way, the uploading unit may sort, according to the offload rule, data received by the PDCP layer, and send the sorted data to the higher layer. This may save power consumption of the UE.

In the foregoing technical solution, on the basis of the foregoing embodiment, the following step is added: The monitoring unit monitors a cell that belongs to the offload base station. Thereby, the UE may effectively monitor cells under the offload base station and first base station to achieve an objective of saving power consumption. In addition, resources of each base station are utilized properly.

Figure 26:
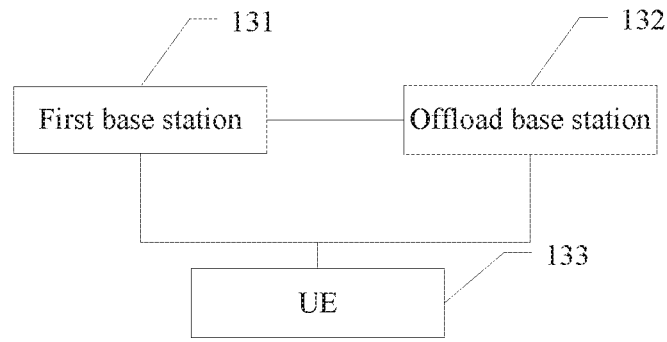

FIG. 26 is a schematic structural diagram of a service transmission system according to an embodiment of the present invention. As shown in FIG. 26, the service transmission system includes a first base station 131, an offload base station 132, and a UE 133.

The first base station 131 is a base station that establishes an RRC connection with the UE 133. The first base station in this embodiment may be any base station that establishes an RRC connection with the UE according to the foregoing embodiment. For example, the first base station may include a first sending unit and a second sending unit.

The first sending unit is configured to send a request message to the offload base station, where the request message includes at least one piece of service information, where the service information includes QoS information of a service and/or configuration information of an RB, the offload base station is at least one base station in base stations serving the UE, and the request message instructs the offload base station to perform resource configuration according to the at least one piece of service information.

The second sending unit is configured to send a configuration message to the UE, where the configuration message includes configuration list information of the RB and/or cell information of the offload base station, so that the UE configures the corresponding RB according to the configuration message.

The offload base station 132 is a base station serving the UE 133. The first base station in this embodiment may be any base station serving the UE according to the foregoing embodiment. For example, the offload base station 132 may include a second receiving unit and a second configuring unit.

The second receiving unit is configured to receive the request message sent by the first base station, where the request message includes the at least one piece of service information, where the service information includes the QoS information of the service and/or the configuration information of the RB, and the first base station is the base station that establishes the RRC connection with the UE.

The second configuring unit is configured to configure the resource configuration corresponding to the at least one piece of service information.

Optionally, there may be multiple offload base stations 132.

The UE 133 in this embodiment may be any UE provided by the foregoing embodiment. For example, the UE may include a third receiving unit and a third configuring unit.

The third receiving unit is configured to receive the configuration message sent by the first base station, where the configuration message includes the configuration list information of the RB and/or the cell information of the offload base station, where the first base station is the base station that establishes the RRC connection with the UE, and the offload base station is the at least one base station serving the UE.

The third configuring unit is configured to configure the corresponding RB according to the configuration message.

In the foregoing technical solution, a first base station sends a request message to an offload base station; the offload base station receives the request message sent by the first base station, and establishes an RB in the request message; the first base station sends a configuration message to a UE; the UE receives the configuration message and configures the RB corresponding to the offload base station and/or first base station. Thereby, both the offload base station and the first base station may send services to the UE by using the established RB. Therefore, resources of the offload base station are utilized properly, and utilization of network resources is improved.

Figure 27:
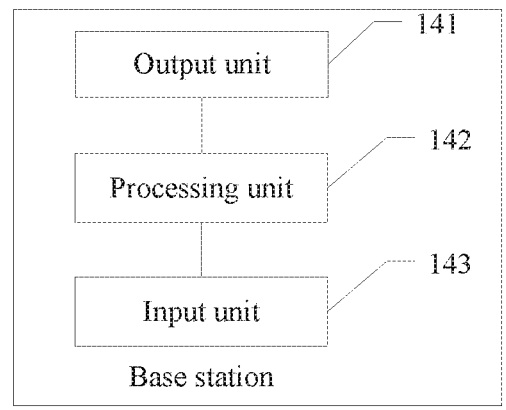

FIG. 27 is a schematic structural diagram of a base station according to an embodiment of the present invention. The base station is a base station that establishes an RRC connection with the UE. As shown in FIG. 27, the base station includes an output apparatus 141, a processor 142, and an input apparatus 143.

The processor 142 is configured to execute the following steps:

send a request message to an offload base station, where the request message includes at least one piece of service information, where the service information includes QoS information of a service and/or configuration information of an RB, the first base station is the base station that establishes the RRC connection with the UE, the offload base station is at least one base station in base stations serving the UE, and the request message instructs the offload base station to perform resource configuration according to the at least one piece of service information; and send a configuration message to the UE, where the configuration message includes configuration list information of the RB and/or cell information of the offload base station, so that the UE configures the corresponding RB according to the configuration message.

Optionally, the configuration information of the RB includes: configuration information of a PDCP layer, an RLC layer, a MAC layer, and a physical layer, or configuration information of an RLC layer, a MAC layer, and a physical layer.

In this way, the offload base station may configure the PDCP layer, RLC layer, MAC layer, and physical layer, or RLC layer, MAC layer, and physical layer of the RB corresponding to the at least one piece of service information.

Optionally, the service information may further include:

at least one of configuration coordination information of radio resources of the RB, the identifier of the RB, the identifier of the RAB, and offload indication information.

Optionally, the configuration coordination information of the radio resources of the RB includes at least one of a physical cell identifier, a logical cell identifier, a virtual cell identifier, frequency information, carrier information, radio resource block information, subcarrier information, subframe information, time-domain information, and space-domain information.

The offload indication information includes RB-based data offload information or packet-based data offload information. The meanings of RB-based data offload information and packet-based data offload information refers to the above embodiments.

Optionally, when the offload indication information includes the packet-based data offload information, the offload base station configures, according to the at least one piece of service information, the RLC layer, MAC layer, and physical layer of the RB corresponding to the at least one service, and then the first base station configures the PDCP layer, RLC layer, MAC layer, and physical layer of the RB.

Optionally, the output apparatus 141 sends information output by the processor, to the offload base station.

In an optional implementation manner, the processor 142 may further be configured to execute the following step:

send the service of the user terminal to the offload base station. An output unit 141 further sends the service of the UE to the offload base station.

Optionally, the service of the UE may be specifically sent by using the output apparatus 141.

In this way, the service of the UE may be sent by multiple base stations.

In an optional implementation manner, the processor 142 is further configured to execute the following step:

receive a response message returned by the offload base station, where the response message includes an identifier of the UE, a status message, and/or an indication message;

where the status message includes a status message for rejecting the request message, or a status message for receiving the request message, or a status message for modifying the request message; and the indication message includes an identifier and/or configuration information of an RB accepted to be established and/or an identifier of a corresponding RAB, and/or an identifier and/or configuration information of an RB rejected to be established and/or an identifier of a corresponding RAB.

Optionally, after the offload base station receives the request message, the offload base station may return a response message to the first base station according to a resource status and/or load status of the offload base station, where the response message includes the identifier of the UE, and the status message and/or indication message.

In an optional implementation manner, the processor 142 may further be configured to execute the following step:

define an offload rule for data packets of the service of the UE, where the offload rule indicates a transmission base station for each data packet of the service of the UE, where the transmission base station is the first base station or the offload base station; and send the offload rule to the UE.

After the UE receives the offload rule, when a PDCP entity receives data packets uploaded by different RLC entities, the UE may sort uploaded data according to the offload rule, with no need to depacketize the uploaded data to obtain a sequence number of each data packet. In this way, power consumption of the UE may be saved.

In an optional implementation manner, the processor 142 may further be configured to execute the following step:

receive a resource status report message and/or channel resource information of the offload base station sent by the offload base station, and/or, receive channel resource information of the offload base station sent by the UE;

where the resource status report message includes the number of data packets that can be sent and/or the number of data packets waiting to be sent in a buffer, and the channel resource includes at least one of a channel quality indicator channel quality indicator CQI, a PMI, and an RI.

In this implementation manner, the processor 142 may further be configured to execute the following step: determine a transmission capability of the offload base station according to the resource status report message and/or channel resource information.

Optionally, the processor 142 further executes the following step:

define an offload policy for the data packets of the service of the UE according to the capability of the offload base station, where the offload policy indicates the number of data packets sent by the offload base station to the UE within a specific time.

Optionally, the processor is further configured to execute the following steps:

send the offload policy to the user terminal, so that the user terminal replaces the offload rule with the offload policy;

send data packets corresponding to the number of data packets of the service of the user terminal to the offload base station; and send data packets beyond data packets corresponding to the number of data packets of the service of the user terminal to the user terminal.

In this implementation manner, the number of data packets of the service of the UE transmitted in each corresponding RB may be determined dynamically according to resource information of the base station to which the RB belongs. Therefore, network resources may be utilized properly, and utilization of the network resources is improved.

In an optional implementation manner, the processor 142 is further configured to execute the following step: send a cross-cell or cross-carrier scheduling indication and the cell information of the offload base station to the UE within a previous on-duration of the UE before the offload base station sends the service to the UE, so that the UE monitors the cell that belongs to the offload base station.

In an optional implementation manner, the base station may further include:

a memory, configured to store programs executed by the processor 142.

In the foregoing technical solution, the first base station may send the service of the UE to the offload base station to which the RB corresponding to the service belongs, so that the offload base station sends the service to the UE. In this way, resources of the offload base station are utilized properly, and utilization of network resources is improved.

Figure 28:
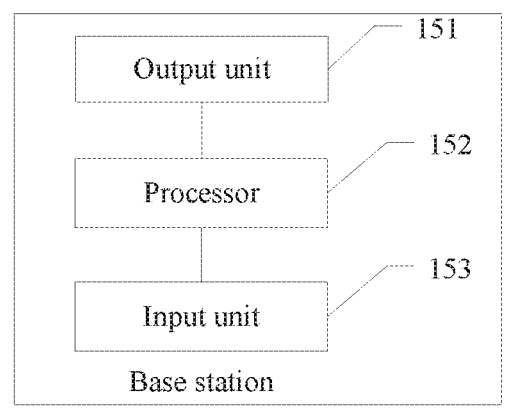

FIG. 28 is a schematic structural diagram of another base station according to an embodiment of the present invention. The base station is a base station that establishes an RRC connection with the UE. As shown in FIG. 28, the base station includes an input apparatus 151, a processor 152, and an output apparatus 153.

The processor 152 is configured to execute the following steps:

send a request message to an offload base station, where the request message includes at least one piece of service information, where the service information includes QoS information of a service and/or configuration information of an RB, the first base station is the base station that establishes the RRC connection with the UE, the offload base station is at least one base station in base stations serving the UE, and the request message instructs the offload base station to establish the RB corresponding to the at least one piece of service information;

send a configuration message to the UE, where the configuration message includes configuration list information of the RB corresponding to the service and/or cell information of the offload base station, so that the UE configures the corresponding RB according to the configuration message;

configure a measurement gap GAP parameter of the UE;

send a measurement notification message to the offload base station, where the measurement notification message includes an identifier of the UE, the GAP parameter, and start time information of the GAP, and the measurement notification message is used to notify the offload base station of measurement configuration information of at least one UE whose service is offloaded by the base station; and send the GAP parameter to the UE.

In the foregoing technical solution, on the basis of the foregoing embodiment, steps of configuring a GAP parameter by the configuring unit and sending the GAP parameter to the offload base station and the UE are added; the offload base station sends a service to the UE only within a time when the UE monitors a cell of a network side, so that the service sent by the offload base station can be received by the UE, and in addition, utilization of network resources is improved.

Figure 29:
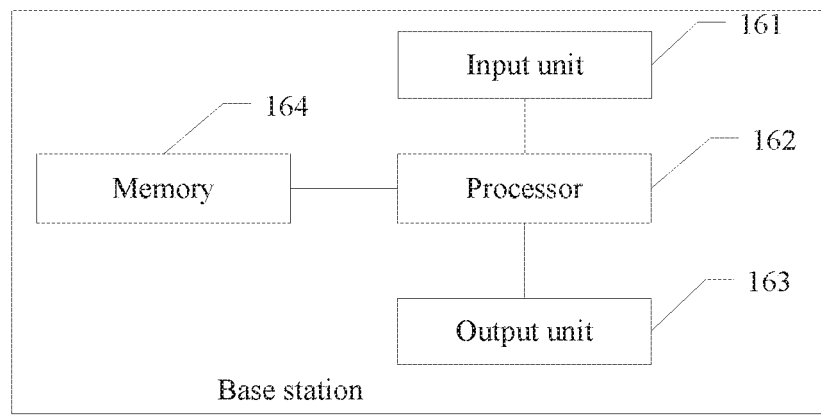

FIG. 29 is a schematic structural diagram of another base station according to an embodiment of the present invention. The base station is a base station serving the UE. As shown in FIG. 29, the base station includes an input apparatus 161, a processor 162, an output apparatus 163, and a memory 164.

The processor 162 is configured to execute the following steps:

receive a request message sent by a first base station, where the request message includes at least one of an identifier of an RB, an identifier of the user terminal, QoS information of the service corresponding to the RB, configuration information of the RB, and an identifier of an RAB corresponding to the RB, and the first base station is a base station that establishes an RRC connection with the user terminal; and configure a resource configuration corresponding to the at least one piece of service information.

The memory 164 stores the resource configuration.

Optionally, the configuration information of the RB includes: configuration information of a PDCP layer, an RLC layer, a MAC layer, and a physical layer, or configuration information of an RLC layer, a MAC layer, and a physical layer.

Optionally, the service information may further include:

at least one of configuration coordination information of radio resources of the RB, the identifier of the RB, the identifier of the RAB, and offload indication information.

Optionally, the configuration coordination information of the radio resources of the RB includes at least one of a physical cell identifier, a logical cell identifier, a virtual cell identifier, frequency information, carrier information, radio resource block information, subcarrier information, subframe information, time-domain information, and space-domain information.

The offload indication information includes RB-based data offload information or packet-based data offload information. The meanings of RB-based data offload information and packet-based data offload information refers to the above embodiments.

Optionally, when the offload indication information includes the packet-based data offload information, the offload base station configures, according to the at least one piece of service information, the RLC layer, MAC layer, and physical layer of the RB corresponding to the at least one service, and then the first base station configures the PDCP layer, RLC layer, MAC layer, and physical layer of the RB.

In an optional implementation manner, the request message may further include:

an identifier of the UE.

Optionally, the processor 162 may be specifically configured to execute the following step: configure the PDCP layer, RLC layer, MAC layer, and physical layer, or RLC layer, MAC layer, and physical layer of the RB corresponding to the at least one piece of service information.

In an optional implementation manner, the processor 162 may further be configured to execute the following step:

receive the service of the user terminal sent by the first base station; and an output unit sends the service to the user terminal.

The base station may receive the service sent by the first base station (for example, the SDU data of the PDCP layer or RLC layer). In comparison with the prior art in which the service sent by the first base station is received at the physical layer, this solution reduces a delay and improves service transmission efficiency; in addition, resources of the base station may be utilized properly, and utilization of network resources is improved.

In an optional implementation manner, the processor 162 may further be configured to execute the following step:

generate a response message, where the response message includes the identifier of the UE, and a status message and/or an indication message; where the status message includes a status message for rejecting the request message, or a status message for receiving the request message, or a status message for modifying the request message; and the indication message includes an identifier and/or configuration information of an RB whose resource configuration is accepted by the offload base station and/or an identifier of a corresponding RAB, and/or an identifier and/or configuration information of an RB whose resource configuration is rejected by the offload base station and/or an identifier of a corresponding RAB.

In an optional implementation manner, the processor 162 may further be configured to execute the following steps:

generate a resource status report message; and/or, for the offload base station to receive channel resource information sent by the UE relative to the offload base station, where the resource status report message includes the number of data packets that can be sent and/or the number of data packets waiting to be sent in a buffer, and the channel resource includes at least one of a CQI, a PMI, and an RI; and send the resource status report message and/or the channel resource information to the first base station, so that the first base station calculates a transmission capability of the offload base station and defines an offload policy according to the transmission capability, where the offload policy indicates the number of data packets of the service sent by the offload base station to the user terminal within a specific time.

Optionally, the processor 162 may further be configured to execute the following step: receive data packets corresponding to the number of data packets of the service sent by the first base station.

Optionally, the processor 162 may further be configured to execute the following steps:

generate indication information, where the indication information instructs the first base station to send a cross-cell or cross-carrier scheduling indication and an identifier of the offload base station to the UE within a previous on-duration of the UE before the offload base station sends the service to the UE; and send the indication information to the first base station, so that the UE monitors a cell that belongs to the offload base station.

In this implementation manner, the first base station defines an offload policy according to a capability of the base station, and the base station receives a data packet sent by the first base station according to the offload policy. In this way, resources of the base station may be utilized properly, and utilization of network resources is improved.

In an optional implementation manner, the processor 162 may further be configured to execute the following step:

encode, according to a pre-obtained allocation policy for redundancy version numbers, the service by using a redundancy version number corresponding to a cell that participates in offload and belongs to the offload base station; or encode, according to a pre-obtained allocation policy for redundancy version numbers, the service by using a redundancy version number corresponding to each time-domain and/or code-domain and/or frequency-domain and/or space-domain resource used for sending the service by a cell that participates in offload and belongs to the offload base station;

where the allocation policy indicates the redundancy version number used by the cell that participates in offload and belongs to the offload base station; or the allocation policy indicates the redundancy version number used by each time-domain and/or code-domain and/or frequency-domain and/or space-domain resource used for sending the service by the cell that participates in offload and belongs to the offload base station.

In this implementation manner, multiple base stations may send the same service to the UE, and resources of each base station serving the UE are utilized properly, so that utilization of network resources is improved.

In an optional implementation manner, the processor 162 may further be configured to execute the following step:

receive a measurement notification message sent by the first base station, where the measurement notification message includes the identifier of the UE, the GAP parameter, and start time information of the GAP.

In the foregoing technical solution, resources of an offload base station may be utilized properly, so that utilization of network resources is improved.

In the foregoing technical solution, the offload base station receives a request message sent by a first base station, and establishes an RB in the request message. In this way, resources of the offload base station are utilized properly, and utilization of network resources is improved.

Figure 30:
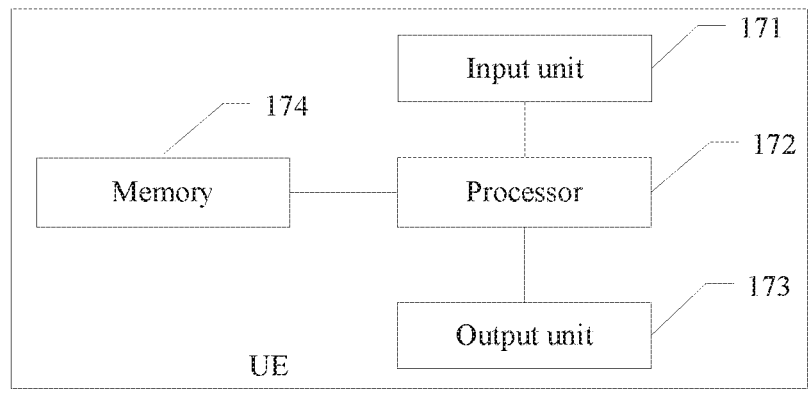

FIG. 30 is a schematic structural diagram of another UE according to an embodiment of the present invention. As shown in FIG. 30, the UE includes an input apparatus 171, a processor 172, an output apparatus 173, and a memory 174.

The processor 172 is configured to execute the following steps:

receive a configuration message sent by a first base station, where the configuration message includes configuration list information of the RB and/or cell information of the offload base station, where the first base station is a base station that establishes an RRC connection with the UE, and the offload base station is at least one base station serving the UE; and configure the corresponding RB according to the configuration message.

The memory 174 stores the configured RB.

Optionally, a configuration list of the RB includes:

the configuration list of the RB includes configuration information of at least one RB, where the configuration information of the RB includes at least one of the following items:

configuration information of a PDCP entity, configuration information of an RLC entity list, and MAC configuration information, a logical channel configuration message, and physical layer configuration information corresponding to each RLC entity in the RLC entity list; an identifier of a service; offload indication information; the offload rule; and configuration information of radio resources.

The offload indication information includes RB-based data offload information or packet-based data offload information.

The offload rule indicates a transmission base station for each data packet of the service of the UE, where the transmission base station is the first base station or the offload base station.

Optionally, the configuration information of the radio resources includes:

at least one of a physical cell identifier, a logical cell identifier, a virtual cell identifier, frequency information, carrier information, radio resource block information, sub-carrier information, time-domain information, and space-domain information.

Optionally, after receiving the configuration message, the UE may configure the corresponding RB. When the configuration message includes the configuration information of the at least one RB, the configuration information includes the configuration information of the PDCP entity, the configuration information of the RLC entity list, and the MAC configuration information, logical channel configuration message, and physical layer configuration information corresponding to each RLC entity in the RLC entity list. In this way, the UE may configure the PDCP layer, RLC layer, MAC layer, and physical layer, where the PDCP layer includes at least one PDCP entity, the RLC layer includes at least one RLC entity, the MAC layer includes at least one MAC entity, and the physical layer includes at least one physical layer entity.

Specifically, the processor 172 executes the following step:

configure the PDCP layer, RLC layer, MAC layer, and physical layer according to the configuration message;

where the PDCP layer includes at least one PDCL entity, the RLC layer includes at least one RLC entity, the MAC layer includes at least one MAC entity, and the physical layer includes at least one physical layer entity.

In this way, the UE may receive, at at least two RLC entities, the service sent by at least two base stations.

In an optional implementation manner, the processor 172 may further be configured to execute the following step:

receive the service sent by the first base station and/or the offload base station.

In an optional implementation manner, the processor 172 may further be configured to execute the following step:

decode, according to an obtained allocation policy, the service by using a redundancy version number of a cell corresponding to the service; or decode, according to an obtained allocation policy, the service by using a redundancy version number of a time-domain and/or code-domain and/or frequency-domain and/or space-domain resource of a cell corresponding to the service;

where the allocation policy indicates a redundancy version number used by a cell that participates in offload and belongs to the offload base station and a redundancy version number used by a cell that participates in offload and belongs to the first base station; or the allocation policy indicates a redundancy version number used by each time-domain and/or code-domain and/or frequency-domain and/or space-domain resource used for sending the service by a cell that participates in offload and belongs to the offload base station and a redundancy version number used by each time-domain and/or code-domain and/or frequency-domain and/or space-domain resource used for sending the service by a cell that participates in offload and belongs to the first base station.

In an optional implementation manner, the processor 172 may further be configured to execute the following steps:

receive a cross-cell or cross-carrier scheduling indication and the cell information of the offload base station, which are sent by the first base station; and monitor the cell that belongs to the offload base station.

Optionally, the UE may specifically further include a radio frequency apparatus, configured to monitor the cell that belongs to the offload base station.

In this implementation manner, the service sent by the first base station and/or offload base station may be accurately received. In addition, the UE may save power consumption.

Optionally, the processor 172 may further be configured to execute the following steps:

monitor the cell that belongs to the first base station; and when a data packet sent by the first base station is received, the radio frequency unit monitors the cell that belongs to the offload base station.

In an optional implementation manner, the processor 172 may further be configured to execute the following steps:

receive MAC control signaling sent by the first base station; and monitor a cell that belongs to at least one base station in the offload base stations.

In this way, the UE may monitor the cell that belongs to the offload base station according to the MAC control signaling of the first base station. Thereby, when the UE does not receive the MAC control signaling, the UE does not monitor the cell that belongs to the offload base station, thereby achieving an effect of saving power consumption.

In an optional implementation manner, the processor 172 may further be configured to execute the following steps:

depacketize the service received by the at least one RLC entity, at the at least one RLC entity, and transmit the service depacketized by the at least one RLC entity to the PDCP layer; and upload the service received by the PDCP layer to a higher layer.

In the foregoing technical solution, a UE may receive services sent by multiple base stations, and the services sent by the multiple base stations are the same. In comparison with the prior art in which a base station sends a service to the UE for multiple times, in this implementation manner, resources of the multiple base stations may be utilized properly.

Figure 31:
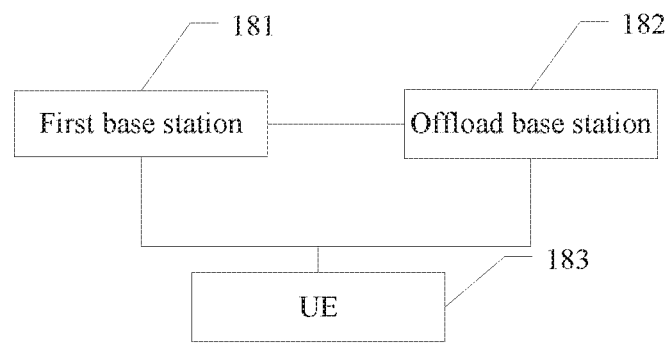

FIG. 31 is a schematic structural diagram of a service transmission system according to an embodiment of the present invention. As shown in FIG. 31, the service transmission system includes a first base station 181, an offload base station 182, and a UE 183.

The first base station 181 is a base station that establishes an RRC connection with the UE 183. The first base station in this embodiment may be any base station that establishes an RRC connection with the UE according to the foregoing embodiment. For example, the first base station 181 may include an output apparatus, a processor, and an input apparatus.

The processor is configured to execute the following steps:

send a request message to the offload base station, where the request message includes at least one piece of service information, where the service information includes QoS information of a service and/or configuration information of an RB, and the request message instructs the offload base station to perform resource configuration according to the at least one piece of service information; and send a configuration message to the user terminal, where the configuration message includes configuration list information of the RB and/or cell information of the offload base station, so that the user terminal configures the corresponding RB according to the configuration message.

The offload base station 182 is a base station serving the UE 183. The first base station in this embodiment may be any base station serving the UE according to the foregoing embodiment. For example, the offload base station 182 may include an input apparatus, a processor, an output apparatus, and a memory.

The processor is configured to execute the following steps:

receive the request message sent by the first base station, where the request message includes at least one of an identifier of the RB, an identifier of the user terminal, and the QoS information of the service corresponding to the RB, the configuration information of the RB, and an identifier of an RAB corresponding to the RB; and configure the resource configuration corresponding to the at least one piece of service information.

The memory stores the resource configuration.

The UE 813 in this embodiment may be any UE provided by the foregoing embodiment. For example, the UE may include an input apparatus, a processor, an output apparatus, and a memory.

The processor is configured to execute the following steps:

receive the configuration message sent by the first base station, where the configuration message includes the configuration list information of the RB and/or the cell information of the offload base station, where the first base station is the base station that establishes the RRC connection with the user terminal, and the offload base station is the at least one base station serving the user terminal; and configure the corresponding RB according to the configuration message.

The memory stores the configured RB.

In the foregoing technical solution, both the offload base station and the first base station may send services to the UE by using the established RB. Therefore, resources of the offload base station are utilized properly, and utilization of network resources is improved.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing descriptions are merely exemplary embodiments of the present invention, but are not intended to limit the present invention. Any equivalent modifications made according to the claims of the present invention still fall within the scope of the present invention.

What is claimed is:

1. A method comprising:
sending, by a first base station, a request message to a second base station, the request message comprising configuration information comprising information of one or more radio bearers (RBs) and further comprising information indicating that a service transmitted by the first base station to a terminal device and a service transmitted by the second base station to the terminal device are the same, the first base station establishes a radio resource control (RRC) connection with the terminal device, and the second base station is a serving base station of the terminal device;
in response to the request message, receiving, by the first base station from the second base station, a response message, the response message comprising an identifier of the terminal device and an indication message, the indication message comprising at least one of a first radio access bearer (RAB) identifier corresponding to a first RB whose resource configuration is accepted, and a second RAB identifier corresponding to a second RB whose resource configuration is refused;
in response to the response message, sending, by the first base station, a configuration message to the terminal device, the configuration message comprising a configuration list information comprising information of the first RB whose resource configuration is accepted for use by the terminal device to configure the first RB; and
sending, by the first base station, data of the service of the terminal device to the second base station for use by the second base station to send the data to the terminal device, and sending, by the first base station, the data of the service of the terminal device to the terminal device.

2. The method of claim 1, further comprising:
determining, by the first base station, an allocation policy of redundancy version numbers, wherein the allocation policy indicates:
a redundancy version number used by a cell that participates in offload and belongs to the second base station and a redundancy version number used by a cell that participates in offload and belongs to the first base station, or
a redundancy version number used by a resource for sending data of the service by a cell that participates in offload and belongs to the second base station and a redundancy version number used by a resource for sending data of the service by a cell that participates in offload and belongs to the first base station; and
sending, by the first base station, the allocation policy of redundancy version numbers to the terminal device.

3. The method of claim 1, wherein the request message further comprises RB-based data offload information or packet-based data offload information, wherein:
when the request message comprises the RB-based data offload information, the configuration information of the RB comprises: configuration information of a packet data convergence protocol (PDCP) layer, a radio link control (RLC) layer, a media access control (MAC) layer, and a physical layer; and
when the request message comprises the packet-based data offload information, the configuration information comprises: configuration information of an RLC layer, a MAC layer, and a physical layer, and the configuration information does not comprise information of a packet data convergence protocol (PDCP) layer.

4. The method of claim 1, wherein the configuration information further comprises at least one of the following items: configuration coordination information of radio resources of the RB, an identifier of the RB, and an identifier of an RAB, wherein the configuration coordination information of the radio resources of the RB comprises at least one of a physical cell identifier, a logical cell identifier, or carrier information.

5. The method of claim 1, further comprising:
configuring, by the first base station, a measurement gap parameter of the terminal device;
sending, by the first base station, a measurement notification message to the second base station, wherein the measurement notification message comprises the measurement gap parameter, and start time information of a gap; and
sending, by the first base station, the measurement gap parameter to the terminal device.

6. The method of claim 5, wherein the measurement gap parameter comprises at least one of a mode of the gap, a measurement period of the gap, or a start position of the gap.

7. An apparatus, the apparatus being configured in a first base station or the apparatus being a first base station, and the apparatus comprising:
a computer-readable storage medium storing executable instructions; and
a processor coupled to the computer-readable storage medium, wherein the executable instructions, when executed by the processor, cause the apparatus to:
send a request message to a second base station, the request message comprising configuration information comprising information of one or more radio bearers (RBs) and further comprising information indicating that a service transmitted by the first base station to a terminal device and a service transmitted by the second base station to the terminal device are the same, the first base station establishes a radio resource control (RRC) connection with the terminal device, and the second base station is a serving base station of the terminal device,
in response to the request message, receive a response message, the response message comprising an identifier of the terminal device and an indication message, the indication message comprising at least one of a first radio access bearer (RAB) identifier corresponding to a first RB whose resource configuration is accepted, and a second RAB identifier corresponding to a second RB whose resource configuration is refused;
in response to the response message, send a configuration message to the terminal device, the configuration message comprising a configuration list information comprising information of the first RB whose resource configuration is accepted for use by the terminal device to configure the first RB, and
send data of the service of the terminal device to the second base station for use by the second base station to send the data to the terminal device, and send the data of the service of the terminal device to the terminal device.

8. The apparatus of claim 7, wherein:
the processor is configured to determine an allocation policy of redundancy version numbers, wherein the allocation policy indicates:
   a redundancy version number used by a cell that participates in offload and belongs to the second base station and a redundancy version number used by a cell that participates in offload and belongs to the first base station, or
   a redundancy version number used by a resource for sending data of the service by a cell that participates in offload and belongs to the second base station and a redundancy version number used by a resource for sending data of the service by a cell that participates in offload and belongs to the first base station; and
the transceiver is further configured to cooperate with the processor to send the allocation policy of redundancy version numbers to the terminal device.

9. The apparatus of claim 7, wherein the request message further comprises RB-based data offload information or packet-based data offload information, wherein:
   when the request message comprises the RB-based data offload information, the configuration information comprises: configuration information of a packet data convergence protocol (PDCP) layer, a radio link control (RLC) layer, a media access control (MAC) layer, and a physical layer; and
   when the request message comprises the packet-based data offload information, the configuration information comprises: configuration information of an RLC layer, a MAC layer, and a physical layer, and the configuration information does not comprise information of a packet data convergence protocol (PDCP) layer.

10. A communication system, comprising:
a second base station; and
a first base station in communication with the second base station, the first base station is configured to:
   send a request message to a second base station, the request message comprising configuration information comprising configuration of one or more radio bearers (RBs) and further comprising information indicating that a service transmitted by the first base station to a terminal device and a service transmitted by the second base station to the terminal device are the same, the first base station establishes a radio resource control (RRC) connection with the terminal device, and the second base station is a serving base station of the terminal device,
   in response to the request message, receive, from the second base station, a response message, the response message comprising an identifier of the terminal device and an indication message, the indication message comprising at least one of a first radio access bearer (RAB) identifier corresponding to a first RB whose resource configuration is accepted, and a second RAB identifier corresponding to a second RB whose resource configuration is refused;
   in response to the response message, send a configuration message to the terminal device, the configuration message comprising a configuration list information comprising information of the first RB whose resource configuration is accepted for use by the terminal device to configure the first RB, and
   send data of the service of the terminal device to the second base station for use by the second base station to send the data to the terminal device, and send the data of the service of the terminal device to the terminal device; and
the second base station is configured to:
   receive the request message from the first base station;
   send the response message to the first base station; and
   establish the first RB for the service based on the configuration of the first RB.

11. The communication system of claim 10, wherein the first base station is further configured to:
   determine an allocation policy of redundancy version numbers, the allocation policy indicating:
      a redundancy version number used by a cell that participates in offload and belongs to the second base station and a redundancy version number used by a cell that participates in offload and belongs to the first base station, or
      a redundancy version number used by a resource for sending data of the service by a cell that participates in offload and belongs to the second base station and a redundancy version number used by a resource for sending data of the service by a cell that participates in offload and belongs to the first base station; and
   send the allocation policy of redundancy version numbers to the terminal device.

12. The communication system of claim 10, wherein the request message further comprises RB-based data offload information or packet-based data offload information, wherein:
   when the request message comprises the RB-based data offload information, the configuration information comprises: configuration information of a packet data convergence protocol (PDCP) layer, a radio link control (RLC) layer, a media access control (MAC) layer, and a physical layer; and
   when the request message comprises the packet-based data offload information, the configuration information comprises: configuration information of an RLC layer, a MAC layer, and a physical layer, and the configuration information does not comprise information of a packet data convergence protocol (PDCP) layer.

13. The communication system of claim 10, wherein the configuration information further comprises at least one of the following items: configuration coordination information of radio resources of the RB, an identifier of the RB, and an identifier of an RAB, wherein the configuration coordination information of the radio resources of the RB comprises at least one of a physical cell identifier, a logical cell identifier, or carrier information.

14. The communication system of claim 10, wherein the first base station is further configured to:
   configure a measurement gap parameter of the terminal device;
   send a measurement notification message to the second base station, wherein the measurement notification message comprises the measurement gap parameter, and start time information of a gap; and
   send the measurement gap parameter to the terminal device.

15. The communication system of claim 14, wherein the measurement gap parameter comprises at least one of a mode of the gap, a measurement period of the gap, or a start position of the gap.

16. A method comprising:
    receiving, by a second base station, a request message from a first base station, the request message comprising configuration information comprising information of one or more radio bearers (RBs) and further comprising information indicating that a service transmitted by the first base station to a terminal device and a service transmitted by the second base station to the terminal device are the same, the first base station establishes a radio resource control (RRC) connection with the terminal device, and the second base station is a serving base station of the terminal device;
    in response to the request message, sending, by the second base station to the first base station, a response message, the response message comprising an identifier of the terminal device and an indication message, the indication message comprising at least one of a first radio access bearer (RAB) identifier corresponding to a first RB whose resource configuration is accepted, and a second RAB identifier corresponding to a second RB whose resource configuration is refused;
    sending, by the second base station, data of the service to the terminal device.

17. The method of claim 16, wherein the request message further comprises RB-based data offload information or packet-based data offload information, wherein:
    when the request message comprises the RB-based data offload information, the configuration information comprises: configuration information of a packet data convergence protocol (PDCP) layer, a radio link control (RLC) layer, a media access control (MAC) layer, and a physical layer; and
    when the request message comprises the packet-based data offload information, the configuration information comprises: configuration information of an RLC layer, a MAC layer, and a physical layer, and the configuration information does not comprise information of a packet data convergence protocol (PDCP) layer.

18. The method of claim 16, further comprising:
    receiving, by the second base station, a measurement notification message from the first base station, wherein the measurement notification message comprises a measurement gap parameter, and start time information of a gap.

19. An apparatus, the apparatus being configured in a second base station or the apparatus being a second base station, the apparatus comprising:
    a computer-readable storage medium storing executable instructions; and
    a processor coupled to the computer-readable storage medium, wherein the executable instructions, when executed by the processor, cause the apparatus to:
        receive a request message from a first base station, the request message comprising configuration information comprising information of one or more radio bearers (RBs) and further comprising information indicating that a service transmitted by the first base station to a terminal device and a service transmitted by the second base station to the terminal device are the same, the first base station establishes a radio resource control (RRC) connection with the terminal device, and the second base station is a serving base station of the terminal device;
        in response to the request message, send a response message, the response message comprising an identifier of the terminal device and an indication message, the indication message comprising at least one of a first radio access bearer (RAB) identifier corresponding to a first RB whose resource configuration is accepted, and a second RAB identifier corresponding to a second RB whose resource configuration is refused; and
        send data of the service to the terminal device.

20. The apparatus of claim 19, wherein the request message further comprises RB-based data offload information or packet-based data offload information, wherein:
    when the request message comprises the RB-based data offload information, the configuration information comprises: configuration information of a packet data convergence protocol (PDCP) layer, a radio link control (RLC) layer, a media access control (MAC) layer, and a physical layer; and
    when the request message comprises the packet-based data offload information, the configuration information comprises: configuration information of an RLC layer, a MAC layer, and a physical layer, and the configuration information does not comprise information of a packet data convergence protocol (PDCP) layer.

* * * * *